US007711825B2

(12) United States Patent
Lamport

(10) Patent No.: US 7,711,825 B2
(45) Date of Patent: May 4, 2010

(54) SIMPLIFIED PAXOS

(75) Inventor: Leslie B. Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1891 days.

(21) Appl. No.: 10/750,600

(22) Filed: Dec. 30, 2003

(65) Prior Publication Data

US 2005/0198106 A1    Sep. 8, 2005

(51) Int. Cl.
*G06F 15/16* (2006.01)
(52) U.S. Cl. ............... 709/227; 709/223; 709/203; 709/205
(58) Field of Classification Search .......... 709/201, 709/205, 223
See application file for complete search history.

(56) References Cited

U.S. PATENT DOCUMENTS

| | | | |
|---|---|---|---|
| 6,519,697 B1 * | 2/2003 | Denman et al. ............ 713/1 |
| 6,671,821 B1 | 12/2003 | Castro et al. | |
| 7,392,302 B2 * | 6/2008 | Halpern ................. 709/223 |
| 2003/0065708 A1 * | 4/2003 | Jacobs et al. ............. 709/201 |
| 2003/0158908 A1 * | 8/2003 | Jacobs et al. ............. 709/214 |
| 2003/0233433 A1 * | 12/2003 | Halpern ................. 709/222 |

OTHER PUBLICATIONS

Rajsbaum, Sergio "Deconstructing Paxos" Mar. 2003, ACM SIGACT News, vol. 34, No. 1, pp. 47-67.*

Englert, Burkhard and Gafni, Eli "Fast Collect in the absence of contention" IEEE, Proceedings of the 22nd International Conference on Distributed Computing Systems (ICDS'02), Jul. 2-5, 2002, pp. 537-543.*
Boichat, R. et al., "Deconstructing Paxos", *ACM Sigact News*, Mar. 2003, 34(1), 47-67, XP 002358967.
Boichat, R. et al., "Reconstructing Paxos", *ACM Sigact News*, Jun. 2003, 34(2), 42-57, XP 002358966.
Lamport, L., "Paxos Made Simple", http://research.microsoft.com/users, 2001, 14 pages, XP-002358841.
Keidar, Idit, et al.; On the Cost of Fault-Tolerant Consensus When There Are No Faults—A Tutorial; SIGACT News 32(2), Distributed Computing column, pp. 45-63; Jun. 2001.
Dwork, Cynthia, et al.; Consensus in the Presence Of Partial Synchrony; *Journal of the ACM*, 35(2):288-323, Apr. 1988.

(Continued)

*Primary Examiner*—John Follansbee
*Assistant Examiner*—Anthony Mejia
(74) *Attorney, Agent, or Firm*—Woodcock Washburn LLP

(57) ABSTRACT

A simplified fault tolerant algorithm is presented for operating a distributed computing system in a fault tolerant manner. A system comprising three computing devices need only have two devices agree to perform any proposed function. Thus, when soliciting a vote for a proposed function, a leader device can also send its vote for the proposed function. This allows any recipient device to complete the quorum with its own vote. Consequently, any recipient device can, without any further messages, determine whether to execute the proposed function. Furthermore, if the device executes the proposed function, it can transmit the results directly to the client that requested the function, saving a message delay. If the quorum of devices used to select and execute proposed functions is itself selected by a quorum, then one of the devices of the system can be an inexpensive device having limited computational ability or storage capacity.

37 Claims, 33 Drawing Sheets

OTHER PUBLICATIONS

Lampson, Butler W.; How to Build a Highly Available System Using Consensus; http://www.research.microsoft.com.

Lamport, Leslie; The Implementation of Reliable Distributed Multiprocess Systems; *Computer Networks*, 2:95-114, 1978.

Lamport, Leslie, et al.; The Byzantine Generals Problem; ACM Transactions on Programming Languages and Systems, vol. 4, No. 3, Jul. 1982, pp. 382-401.

Lamport, Leslie, "Time, Clocks, and the Ordering of Events in a Distributed System", *Communication of the ACM*, 21(7):558-565, Jul. 1978.

Lamport, Leslie, "The Part-Time Parliament", *ACM Transactions on Computer Systems* 16, 2 (May 1998), pp. 133-169. Also appeared as SRC Research Report 49.

Lamport, Leslie, "Paxos Made Simple", *ACM SIGACT* News (Distributed Computing Column), 32,4 (Whole No. 121, Dec. 2001) pp. 18-25.

Lampson, Butler W., "The ABCD''s of Paxos", Presented at *Principles of Distributed Computing*, 2001, as one of the papers celebrating Leslie Lamport's 60$^{th}$ Birthday, retrieved from http://research.microsoft.com/lampson/65-ABCDPaxos/Acrobat.pdf.

Castro, Miguel, et al., "Practical Byzantine Fault Tolerance", appears in *Proceedings of the Third-Symposium on Operating Design and Implementation*, New Orleans, USA, Feb. 1999, pp. 1-14.

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Huang, Yennun, et al., "Software Rejuvenation: Analysis, Module and Applications", *Proc. International Symposium on Fault Tolerant Computing*, pp. 381-390, (1995).

Bracha, Gabriel, "An asynchronous $\lfloor(\eta-1)/3\rfloor$—resilient consensus protocol" this paper was presented at the *ACM Symposium on Principles of Distributed Computing* 1984, pp. 154-162.

Keidar, Idit, et al., "Moshe: A Group Membership Service for WANs" to appear in *ACM Transactions on Computer Systems* (*TOCS*), Aug. 2002, pp. 1-47.

Khazan, Roger, I., "A One-Round Algorithm for Virtually Synchronous Group Communication in Wide Area Networks", Ph.D. dissertation, Department of Electrical Engineering and Computer Science. MIT., May 22, 2002. Thesis Supervisors: Prof. Nancy A. Lynch and Dr. Idit Keidar. Retrieved from http://theroy.1cs.mit.edu/~roger/Research/Papers/khazan-phd.pdf.

Anceaume et al., "Converging Toward Decision Conditions" 6$^{th}$ *International Conference on Principles of Distributed Systems*, France, pp. 53-63 (Dec. 11-13, 2002).

Mostefaoui et al., "IRISA Research Report No. 1355" (Oct. 2000).

Brasileiro et al., "IRISA Research Report No. 1321" (Apr. 2000).

Schneider, F.; Implementing Fault-tolerant Services Using the State Machine Approach: A Tutorial; *Computing Surveys*, 22(3):299-319, Sep. 1990.

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast asynchronous Byzantine agreement with optimal resilience; *Proc. 25th Annual ACM Symposium on Theory of Computing (STOC)*, pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrid and Link Faults; *Dependable Computing for Critical Applications—5*, pp. 79-90, IFIP WG 10.4, preliminary proceedings, 1995.

Reiter, M. K.; the Rampart toolkit for building high-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A High-Throughput Secure Reliable Multicast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the 9$^{th}$ IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings 16$^{th}$ ACM Symposium on Principles of Distributed Computing (PODC)*, pp. 249-257, Aug. 1997.

Kihlstrom, K. P. et al.; Solving Consensus in a Byzantine Environment Using an Unreliable Fault Detector; *Proceedings of the International Conference on Principles of Distributed Systems (OPODIS'97)*, Hermes, Chantilly, France, 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of The 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*; pp. 74-81, 1999.

Guerraoui, Rachid et al.; *Reducing the Cost for Non-Blocking in Atomic Commitment*, Département d'Informatique, Ecole Polytechnique Federále de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Federále de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the 13$^{th}$ Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43, Sep. 1993.

Adya, A., et al.; Farsite: Federated, Available, and Reliable Storage for an Incompletely Trusted Environment.; *In Proc. 5$^{th}$ OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., Group Communication Specifications: A Comprehensive Study; *ACM Computing Surveys*, pp. 33(4):427-469, Dec. 2001.

Deprisco, R., et al., Revisiting the Paxos Algorithm; *In Proc. 11$^{th}$ Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems (TOPLAS)*, pp. 6(2):264-280, Apr. 1984.

Lamport, L., et al., Cheap Paxos; *In Proc. International Conference on Dependable Systems and Networks (DSN)*, Florence, Italy, 2004.

Lynch, N., et al., RAMBO: A Reconfigurable Atomic Memory Service for Dynamic Network; *In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.

Rodrigues, R., et al., BASE: Using Abstractions to Improve Fault Tolerance; *In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; *In Proc. 1st NSDI*, San Francisco, CA, pp. 323-236, 2004.

Pedone, F., et al., Handling Message Semantics with Generic Broadcast Protocols, *Distributed Computing 15*, pp. 97-107, 2002.

Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al:, Uniform Consensus is Harder than Consensus (extended abstract), *Technical Report DSC/2000/028*, Switzerland, May 2000.

DePrisco, Robert, et al., Revisiting the PAXOS Algorithm, *Theroretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing*, vol. 2584 *of Lecture Notes in Computer Science*, pp. 22-23, Spring, 2003.

Mazurkiewicz, A., *Semantics of Concurrent Systems; A Modular Fixed-Point Trace Approach*; Institute of Computer Science, Poland, pp. 353-375.

* cited by examiner

SIMPLIFIED PAXOS

FIELD OF THE INVENTION

This invention relates generally to distributed computing and, more particularly, relates to efficient fault tolerant distributed computing using a small number of computing devices.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to provide more reliable access to data and computational resources.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a different proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not continually repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

The distributed computing system, as a whole, can be modeled as a state machine. Thus, a distributed computing system implementing complete redundancy can have each of the devices replicate the state of the overall system. Such a system requires that each device maintain the same state. If some devices believe that one client command was executed, while a second group of devices believes that a different client command was executed, the overall system no longer operates as a single state machine. To avoid such a situation, a majority of the devices can be generally required to select a proposed client command for execution by the system. Because any two groups of devices, each having a majority, must share at least one device, mechanisms, such as the Paxos algorithm, can be implemented that rely on the at least one common device to prevent two groups, each containing a majority of devices, from selecting different proposed client commands.

However, the Paxos algorithm adds message delays between when a client sends a request for the distributed system to execute a command, and when the client receives the results from the execution of that command. Specifically, even if the client transmits a request to a leader, and even if the leader has already learned of previously voted on proposals, and thus has completed the first phase of the Paxos algorithm, there can still be two or more message delays between the transmission of the request from the client, and the transmission of the results to the client.

BRIEF SUMMARY OF THE INVENTION

Therefore, in one embodiment of the present invention, a fault tolerant system having a smaller number of devices can implement a more efficient Paxos algorithm and can introduce as little as a single message delay between the transmission of a request from a client, and the transmission of the results to the client.

In another embodiment, a more efficient Paxos algorithm is presented, in which a leader can send two types of second phase messages together, allowing a receiving computing device to determine the results of the execution of the request without introducing an additional message delay.

In a further embodiment, a leader computing device does not need to be a learner, allowing other computing devices in the distributed computing system to learn of the results of an executed command more quickly. Additionally, computing devices not participating in the execution of the more efficient Paxos algorithm can also be learners, as can client computing devices.

In a still further embodiment, at least one computing device of the computing devices participating in the execution of the more efficient Paxos algorithm can be an inexpensive computing device, possibility having limited computing and memory storage capabilities.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the more efficient Paxos algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
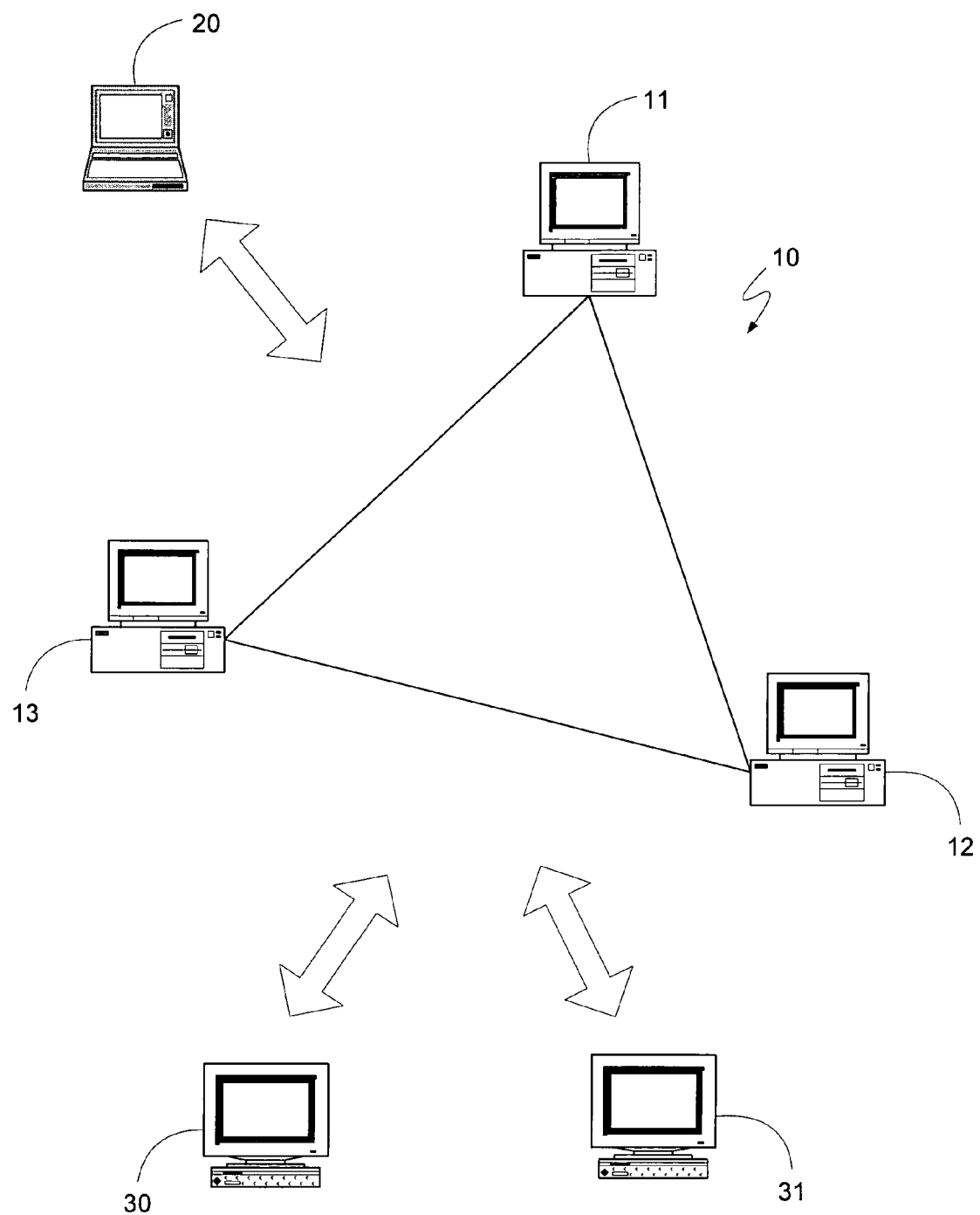
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide access to information and other services to clients.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can have the same state and if a device fails it need only determine the last function it executed, identify, from the list, any functions that have been agreed upon since that last function, and execute those functions.

A distributed computing system acting as a server can be especially useful for serving a large amount of information to a diverse set of clients, such as a central database for a multinational corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

The Paxos algorithm, however, introduces a series of message delays between the receipt of the client's request, and the transmission, to the client, of the results. Specifically, upon receipt of a client's request, and assuming that the first phase of the Paxos algorithm was previously completed and the leader now knows the appropriate proposal number to use, the leader can send a request for a vote, using an appropriate proposal number, to the other devices executing the Paxos algorithm. This step can introduce one message delay. Subsequently, the other devices executing the Paxos algorithm can return their votes to the leader, which can introduce a second message delay. Once the leader receives votes from a quorum of devices, it can instruct the devices to execute the client's request. Simultaneously, the leader itself can execute the client's request and can return the results to the client. Thus, not counting the transmissions between the client and the leader, the Paxos algorithm can introduce two or more message delays between the client's request and the response.

As will be shown in detail below, by combining messages in a distributed computing environment having a sufficiently small number of constituent computing devices, at least one message delay can be eliminated between the client's request and a response to the client.

Distributed Computing Environment

Turning to the drawings, wherein like reference numerals refer to like elements, the invention is illustrated as being implemented in a distributed computing system, such as the exemplary distributed computing system 10 shown in FIG. 1. For ease of presentation only, the present invention will be described with reference to distributed computing system 10, comprising computing devices 111 through 13, which are all interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20, though the present invention is intended to operate in environments having any number of client computing devices. Client computing device 20 is illustrated as having a generic communicational connection to the distributed computing system 10. As will be known by those skilled in the art, such a communicational connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communicational connection can use any communication medium and protocol, and can allow the computing devices 30 and 31 to communicate with one or more of the computing devices in the distributed computing system 10. As will be described in further detail below, computing devices 30 and 31 can learn of the results of executions performed by the system 10 without being part of the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
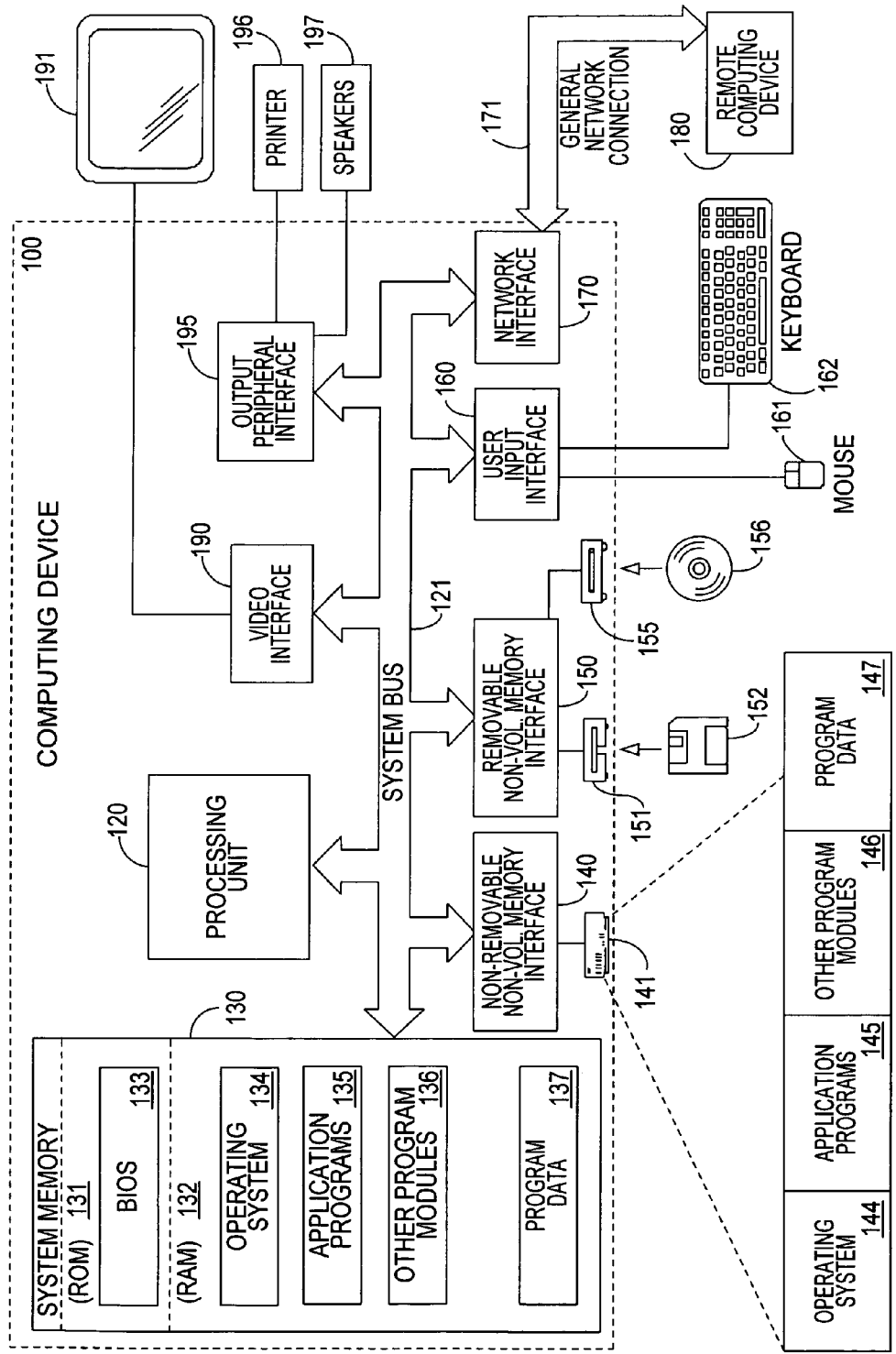
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-13, 20, or 30-31 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, after a leader has completed the first phase of the Paxos algorithm, or has otherwise established a proper proposal number for the current step, the leader can submit a client's request for a vote. Together with the message requesting a vote on the execution of the client's request, the leader can also send its vote for the execution of the request. In a distributed computing system having three computing devices, any two such devices can be a majority and a sufficiently large quorum to maintain proper operation of the distributed system so long as less than a majority of the devices of the system fail. Because two devices can constitute a quorum, when any other device receives the leader's request for a vote together with the leader's vote, then if that device were to also vote for the execution of the client's request, a quorum, comprising the leader and that other device, would exist. Consequently, if the device votes for the execution of the client's request, it can then proceed to execute the request and provide the results to the client, without waiting for any further messages.

As indicated, in a three device system, any two devices form a quorum. Thus, when the leader sends its own vote together with the request for a vote, any of the other two devices, if they should choose to vote as the leader has, can complete the quorum. Furthermore, because the other two devices would have already received the leader's vote, and would be aware of their own vote, they can determine, without waiting for any further messages whether a quorum has voted for the performance of the client's request, and can therefore perform the client's request, if appropriate, and return the results to the client without further message delays.

To conserve messages or storage and processing capabilities, the leader does not need to learn of the quorum's vote. Because the leader's vote is sent with the request for a vote, the other devices can individually determine whether a quorum has agreed to execute the client's request based on the leader's vote and their own vote. Without an explicit transmission back to the leader, however, the leader may never learn of the other devices' votes. However, it is not required that the leader learn of the quorum's vote. Thus, a message can be sent to the leader indicating the results of the vote, or, to conserve messages, or to conserve the leader's storage or processing capabilities, the leader need not receive such a message.

While the leader need not learn of the quorum's vote, other computing devices, in addition to the client, may wish to learn of the results of the execution of the client's request. Consequently, a device that determines that the client's request should be executed, and executes the request, can send the results to the client, and to other computing devices. Such other computing devices can include devices using the Paxos algorithm to maintain redundancy in a distributed computing system, and other devices that may not be part of the Paxos algorithm, but may also seek to learn the results of the executions performed by the system.

Because some of the devices using the Paxos algorithm to maintain redundancy, such as the leader, need not learn of the results of any particular vote or execution of a client request, such devices can be implemented with inexpensive computing devices having limited storage or processing capabilities. Furthermore, such inexpensive devices can only participate in the Paxos algorithm to the extent required to select a quorum, further reducing their involvement and, consequently, the minimum required processing or storage capabilities.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety.

Paxos Algorithm

By using a state machine approach, the synchronization of the constituent devices 11 through 13 of the distributed computing system 10 can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one properly functioning device in common.

To maintain consistency, the system 10 can limit the performance of functions to a single function per step. Therefore, it can be desirable to select only a single function for a given step. Since any two quorums have at least one properly functioning device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multistep process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote for. In such a manner the leader can always learn of previous proposals.

Figure 3A:
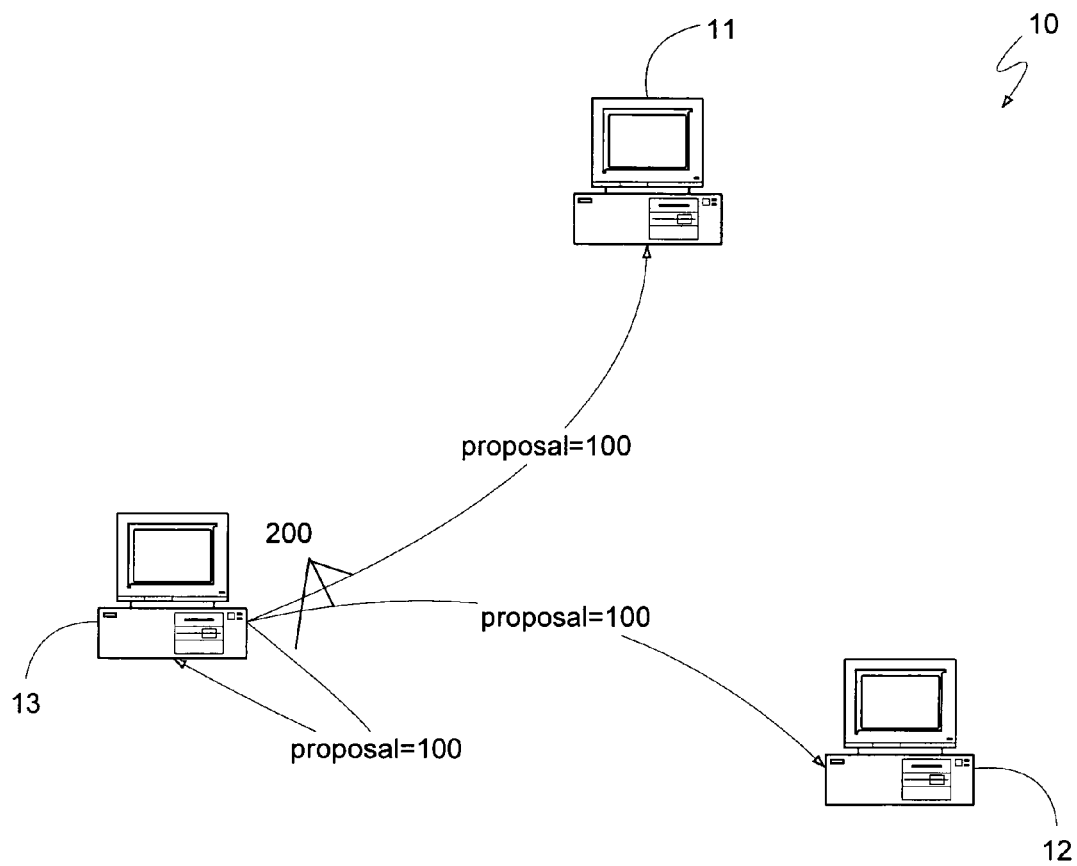
FIGS. 3a-e generally illustrate the operation of a consensus algorithm contemplated by an embodiment of the present invention.

Turning to FIG. 3a, the Paxos algorithm is explained in greater detail using the exemplary distributed computing system 10, comprising the three devices 111 through 13, shown. In such an environment, a quorum can be defined as any group of two or more devices because such a definition will ensure that every quorum has at least one device in common. As shown in FIG. 3a, device 13 can assume a leadership position and transmit message 200 to devices 11 and 12, suggesting a proposal number for a proposal that the system execute a given function. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, efficiencies can be gained by preventing two or more devices using the same proposal number for two or more different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "ith" device proposal numbers congruent to "i" modulo the number of devices in the system.

Because, as will be shown, the Paxos algorithm can operate even if a number of devices act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a pre-determined amount of time, to prevent a constant changing of the leadership device. Such constant leadership change can introduce inefficiencies into the operation of the system.

Figure 3B:
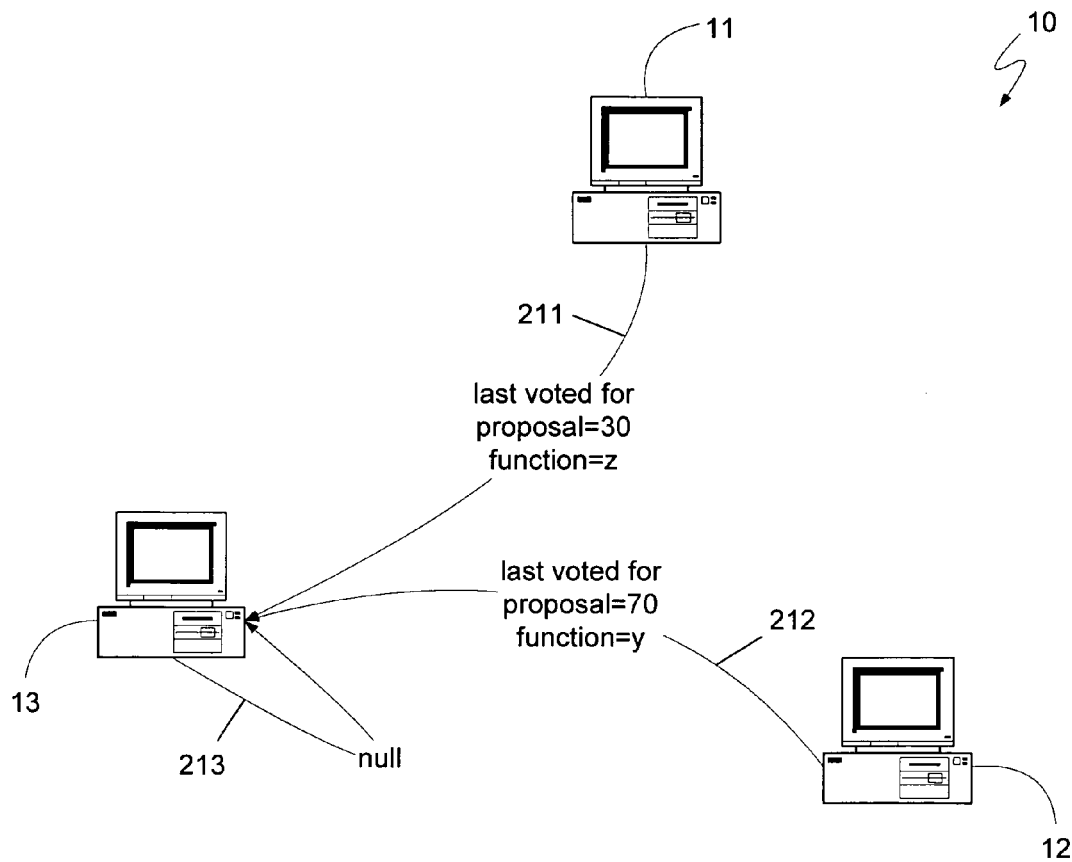

Turning to FIG. 3b, upon receipt of a message, such as message 200, suggesting a new proposal number, each of the device 11 and 12 can respond with message indicating the largest proposal number, that is still less than the proposal number suggested by message 200, and the function proposed by it, for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Device 13 may not have received any proposals and have, therefore, not previously cast a vote for any proposal. It can, therefore, return a null response as indicated by message 213. Again, as above, messages sent from device 13 to itself can be handled internally by device 13, but are illustrated for explanatory purposes.

Figure 3C:
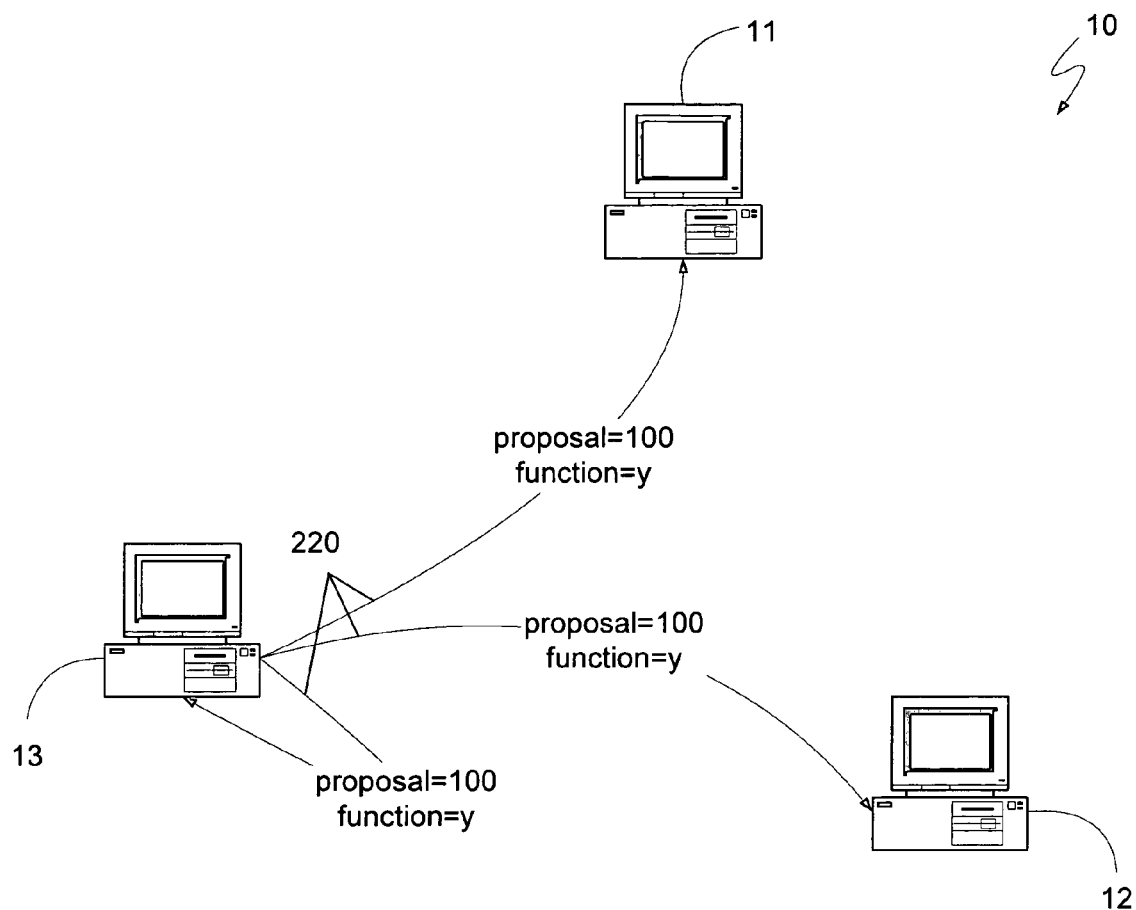

Turning to FIG. 3c, when the leader 13 receives messages 211-213, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-213 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains three devices, a quorum can be as few as two devices. Thus, it is sufficient for the leader 13 to solicit votes for a proposal from devices 11 and 13 only. In such a case, the leader 13 need not propose the function "y" because device 12 is not a member of the selected quorum. Instead, the leader 13 can propose the function "z" as that function was voted for by device 11 as part of proposal number 30. Because proposal number 30 is the largest proposal number voted on by devices in the quorum, the leader can select function "z" to be submitted to a vote.

Because the message 200, suggesting a proposal number, acts as a mechanism by which the leader 13 can determine an appropriate proposal number to select, and enables the leader to learn of all lower numbered proposals that were previously proposed, it can be necessary for the leader 13 to send multiple messages, such as message 200, increasingly suggesting larger proposal numbers if the earlier messages having have too low a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-13 had received and responded to another suggestion for a new proposal, having a proposal number greater than 100, prior to leader 13 sending message 220 as shown in FIG. 3c, then that device may not vote for the function for which a vote was solicited by message 220.

Figure 3D:
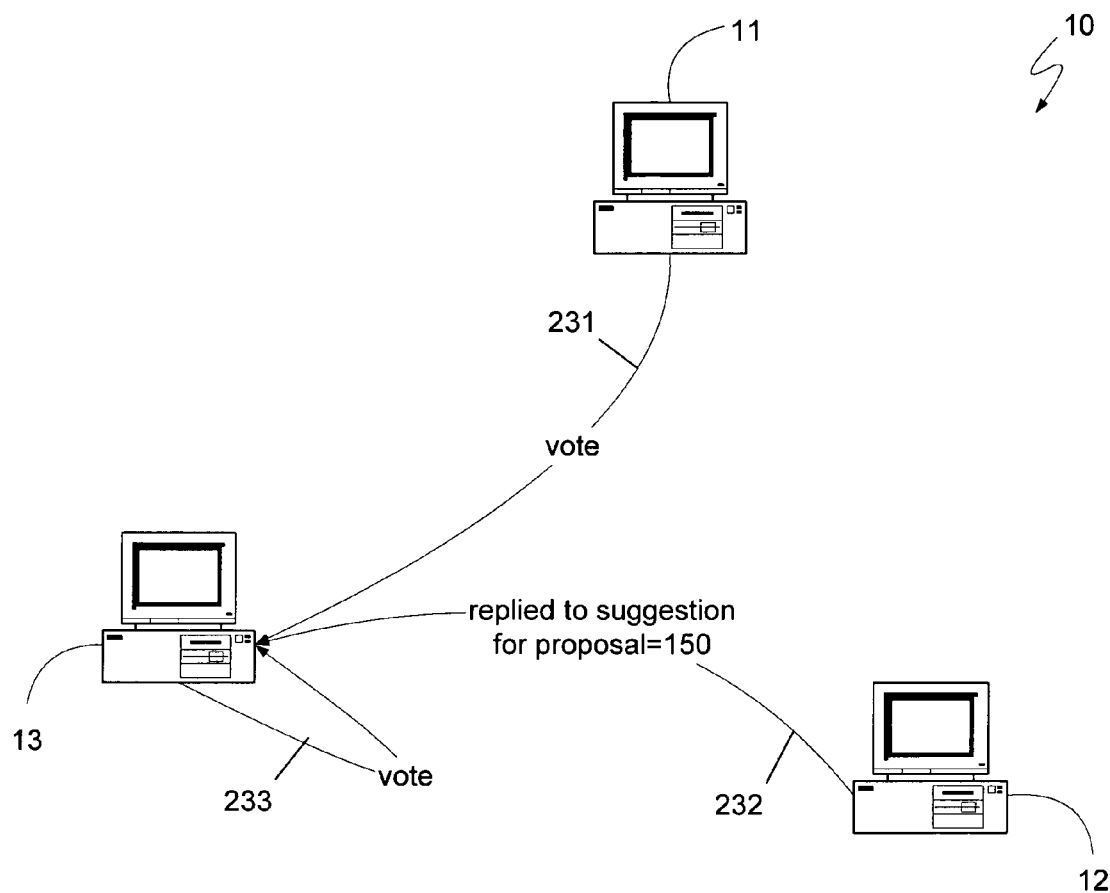

Turning to FIG. 3d, each of the devices 11-13 can independently determine that they have replied to no other suggestions for new proposals with proposal numbers greater than 100. Therefore, because the last suggestion for a new proposal to which they responded is not for a proposal with a larger number than the current proposal, devices 11 and 13 can vote for the proposal and indicate their votes in messages 231 and 233, respectively. As before, message 233 is shown for illustration purposes, and can be handled internally to device 13. Device 12, however, may have, sometime prior to the transmission of message 220, received and responded to a suggestion for a new proposal with a proposal number greater than 100. Therefore, upon receipt of message 220, device 12 can determine that it had already responded to a suggestion for a new proposal with a number greater than 100 and could not, therefore, vote for proposal 100. As a result, as shown in FIG. 3d, device 12 responds with message 232 informing the leader 13 that it has responded to suggestion for a proposal with a proposal number of 150. If leader 13 determines that it needs the vote of device 12, it can send another message, similar to message 220, except with a proposal number greater than 150. Alternatively, device 12 need not respond to message 220, and device 13 can, if it needs device 12's vote, attempt another vote with a proposal with an arbitrarily large proposal number. As can be seen, if device 12 does not indicate the larger proposal number to leader 13, the leader may have to guess and could waste resources guessing, through multiple messages, an appropriately large proposal number.

Figure 3E:
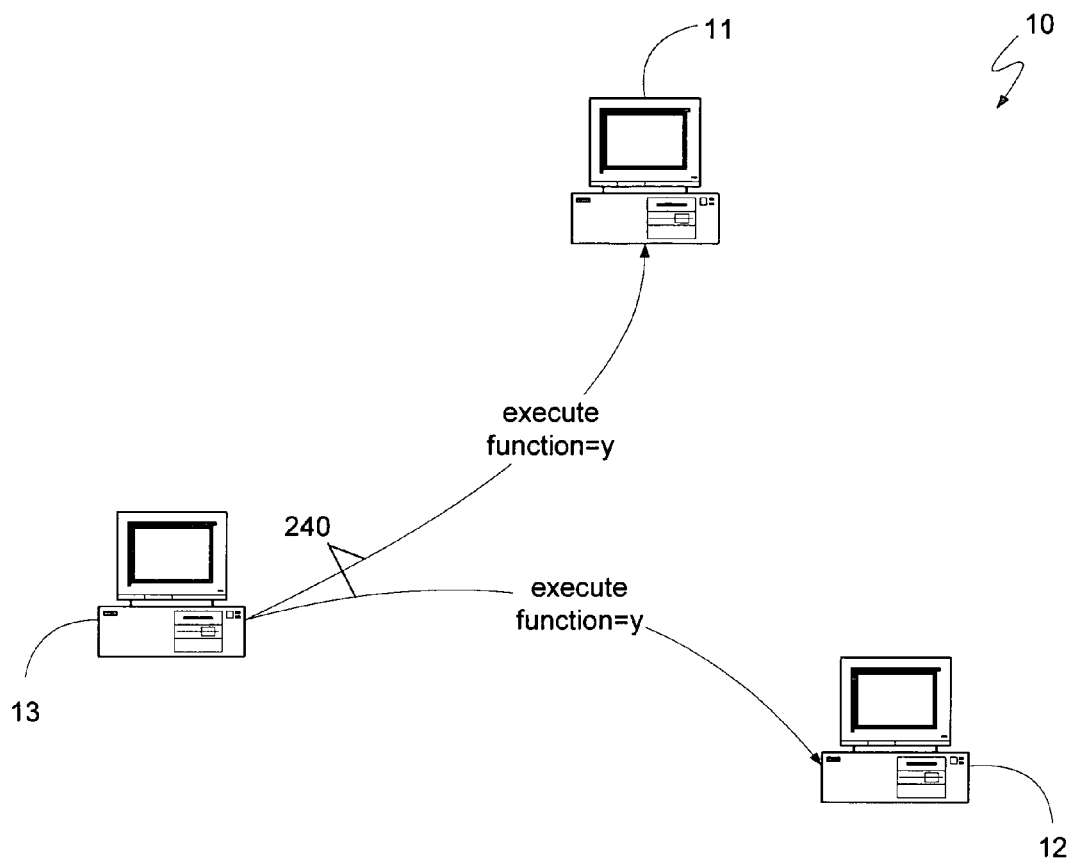

However, because devices 11 and 13 are sufficient to constitute a quorum, the leader 13 can determine that the proposal has been accepted, even without the vote of device 12, and can request, with message 240 as shown in FIG. 3e, that each of the devices 11 and 12 execute function "y". While devices 11 and 13 do constitute a quorum, it is not the same quorum to which leader 13 submitted the proposal to a vote, which included device 12. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, became operational and re-joined the system 10, it might try to propose a function different from "y" for the same step for which the system had selected and executed "y". If such a device sent a proposal with a proposal number less than 100, it could be ignored by devices 1 and 13, since they had already voted on proposal number 100 as shown in FIG. 3d. On the other hand, if the device sent a proposal with a proposal number greater than 100, such as proposal number 130, devices 11 and 13 would return a message indicating that they had voted for function "y" in proposal number 100. Device 12, because it may not have voted, as illustrated in FIG. 3d, might respond with message 212, indicating that it had voted for function "z" in proposal number 30.

The new device could then select the largest proposal among a quorum, which, by definition would include at least some of the devices 11-13, and submit the function proposed in that proposal for voting. Thus, for proposal 130, the new device would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the steps described above, a distributed computing system can agree upon a series of functions to be performed as a series of steps, and can thereby form a continuously operating system. In such a manner the distributed computing system can receive requests from one or more clients, can execute those requests, and can return the results to the clients.

Figure 4A:
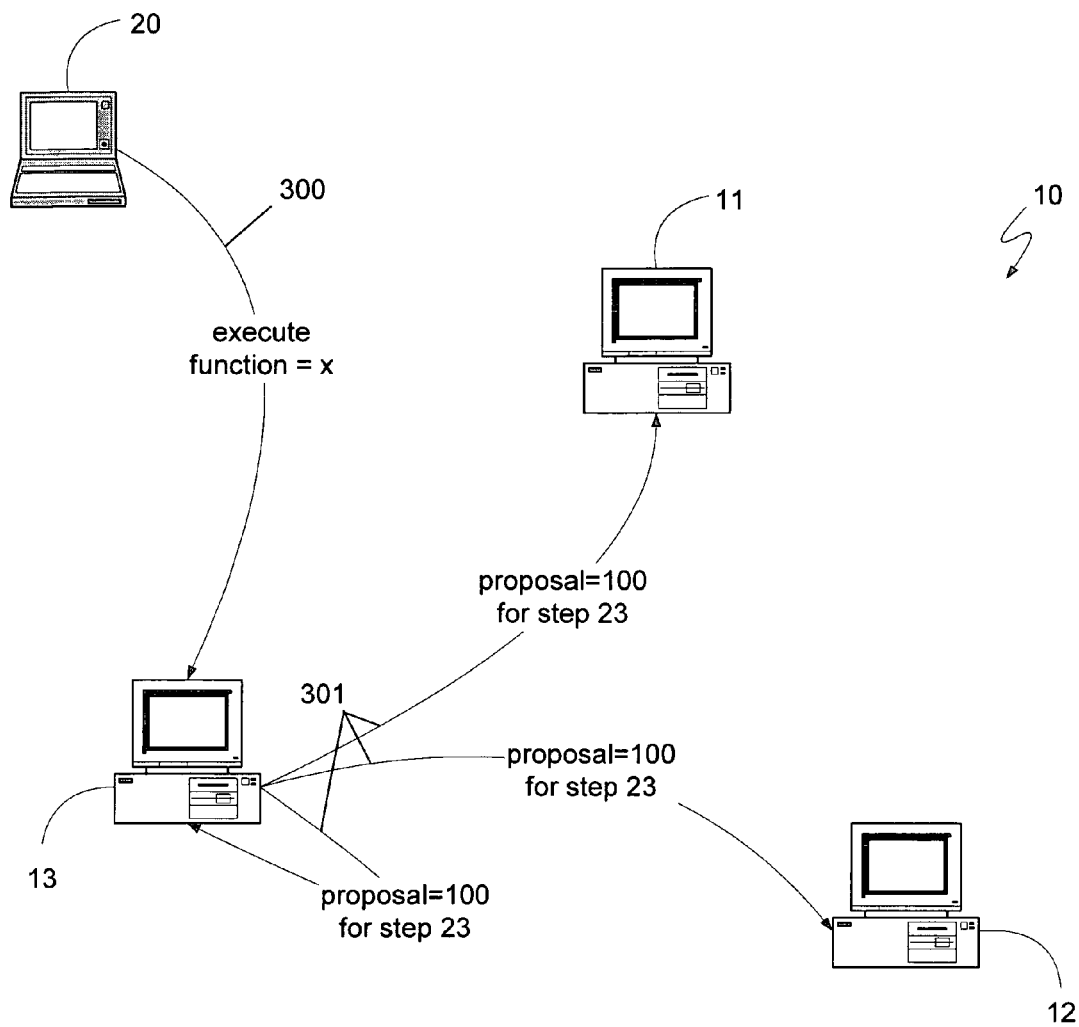
FIG. 4a-g generally illustrate the operation of a multi-step consensus algorithm contemplated by an embodiment of the present invention.

Turning to FIG. 4a, the system 10 can have already been operational for a number of steps. For example, in the exemplary system 10 illustrated in FIG. 4a, the most recently executed step can be step 24, and step 25 can be the current step. However, the device that was previously acting as a leader may have failed, or simply not received any client requests. Client 20 can send a request to execute a function, represented by the variable "x" in FIG. 4a, to device 13 using message 300, as shown. Device 13 can, according to any number of mechanisms, such as those described above, determine that it should attempt to become a leader. As such, device 13 can send message 301 suggesting the use of proposal number 100 for the next proposal, and including the step for which the proposal is being made. In the exemplary distributed computing system 10 of FIG. 4a, device 13 is not aware that steps 23 and 24 have already been decided upon and executed by the other devices 11 and 12. Thus, message 301 indicates that it is suggesting a proposal numbered 100 for step 23.

To expedite the operation of the algorithm in a system executing multiple steps, a message, such as message 301, can be understood to suggest a proposal numbered 100 for all steps greater than or equal to step 23. In such a manner, the leader 13 need not continually transmit messages, such as message 301, until it learns of every step that has already been decided. Instead, the leader 13 can learn of the already executed steps through only a single message round trip, as will be shown.

Figure 4B:
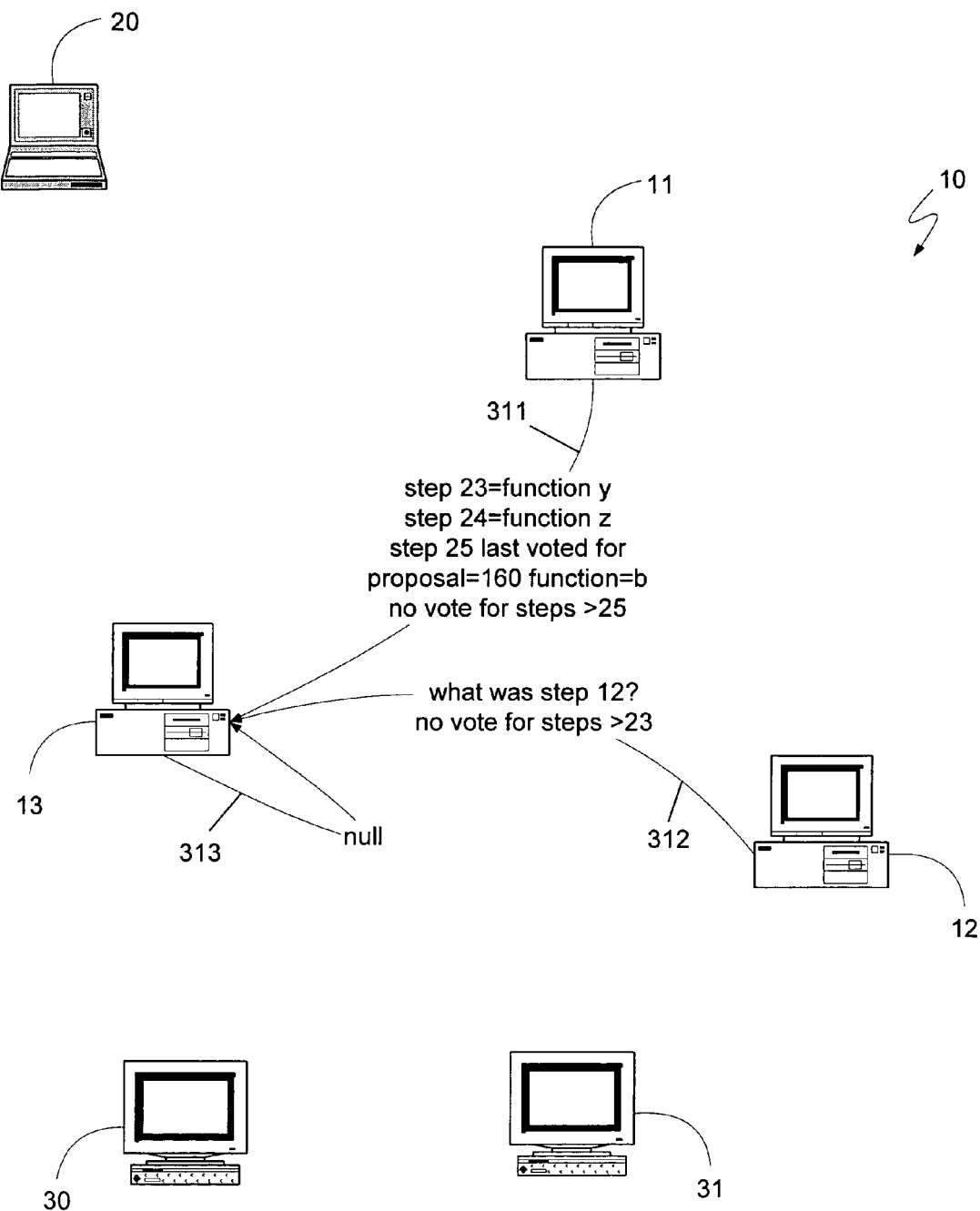

Turning to FIG. 4b, response messages 311-313 from the devices 11-13 of distributed computing system 10 are shown. Device 11, for example, has recorded that function "y" was performed for step 23 and function "z" was performed for step 24. Thus, upon receipt of message 301, device 11 can respond with message 311 indicating the functions it has stored as being performed for all steps greater than or equal to 23; in this case steps 23 and 24. In addition, device 11 can provide an indication of the proposals with the largest proposal numbers for which it has voted for steps greater than or equal to 25. Thus, in the example illustrated in FIG. 4b, message 311, can also indicate that device 11 did not vote for any proposals for steps greater than 25, and that it voted for proposal number 160, proposing function "b" for step 25. To decrease the number of messages being transmitting within the system 10, devices need only respond with their highest proposal number votes if they do not know of a function that has been executed for the given step. Thus, because device 11 was aware that functions were executed for steps 23 and 24, but not step 25, it responded with the functions executed for steps 23 and 24 and the highest numbered proposal for which it voted for step 25.

As before, device 13 can act as both a leader and a voting device. As such, device 13 can send itself messages, such as message 301, and it can respond to itself with messages such as message 313. Such messages are shown in the figures for illustrative purposes only, as they would likely be transmitted internally to device 13. Furthermore, because device 13 can check what is the step with the largest step number for which it knows the function executed, and it can check what the largest proposal number is for the proposals for all steps above that which device 13 voted for, message 313 should rarely contain any information other than a null indicator.

The current state of a state machine may depend, not only on the functions that were executed, but on the order in which those functions were executed. Therefore, if a device does not know which function was executed for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were executed for a step that the device missed. When device 13 sends message 301, as shown in FIG. 4a, it is an implicit statement that device 13 believes that step 23 is the next step and that it has executed the agreed upon functions through step 22. A device that is missing a function for a step below step 23, therefore, knows that device 13 has executed all of the functions through step 22, and it can request that function from device 13.

Returning to FIG. 4b, device 12 does not know what function was executed for step 12. As a result, device 12 may have been unable to execute any functions since step 11, even though it may know the functions executed for steps 13-23. Thus, in message 312, device 12 can request the function for step 12 from the leader 13. In addition, device 12 can indicate that it has not voted on any proposals for steps numbered higher than step 23.

If a device has missed too many steps, it can be more efficient to simply inform the device of the current state rather than transmitting all of the functions for all of the steps it has missed. One mechanism for ensuring that a device does not miss too many steps is to enable each device, or a collection of devices, to periodically take a snapshot of the various parts of the state, or the whole state. The state of another device could, therefore, be updated by sending it the appropriate snapshot together with the functions that were executed since the latest snapshot. Additionally, by using checksums of individual parts of the state, the state of another device could be updated by just sending that other device the parts of the state that differ from its current copy.

As a result of receiving messages 311 through 313, the leader 13 can execute steps 23 and 24, of which it did not previously know, attempt to determine the appropriate function to propose for step 25, and can attempt to update other devices that also had not already executed all of the steps through step 25. Originally, the leader 13 suggested a proposal number of 100 in message 301, but device 11 responded with message 311 indicating that it had already voted for a proposal with a larger proposal number than 100 for step 25. Consequently, leader 13 can select a proposal number greater than the largest proposal number of which the leader is aware of and transmit another suggestion message such as message 320 shown in FIG. 4c. Alternatively, device 11 could have simply ignored the suggestion for proposal number 100 in message 301 because the proposal number was less than the proposal number of the proposal for which device 11 had already voted for. In such a case, the leader would have retried by increasing the proposal number in an attempt to account for devices that ignored the initial suggestion. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
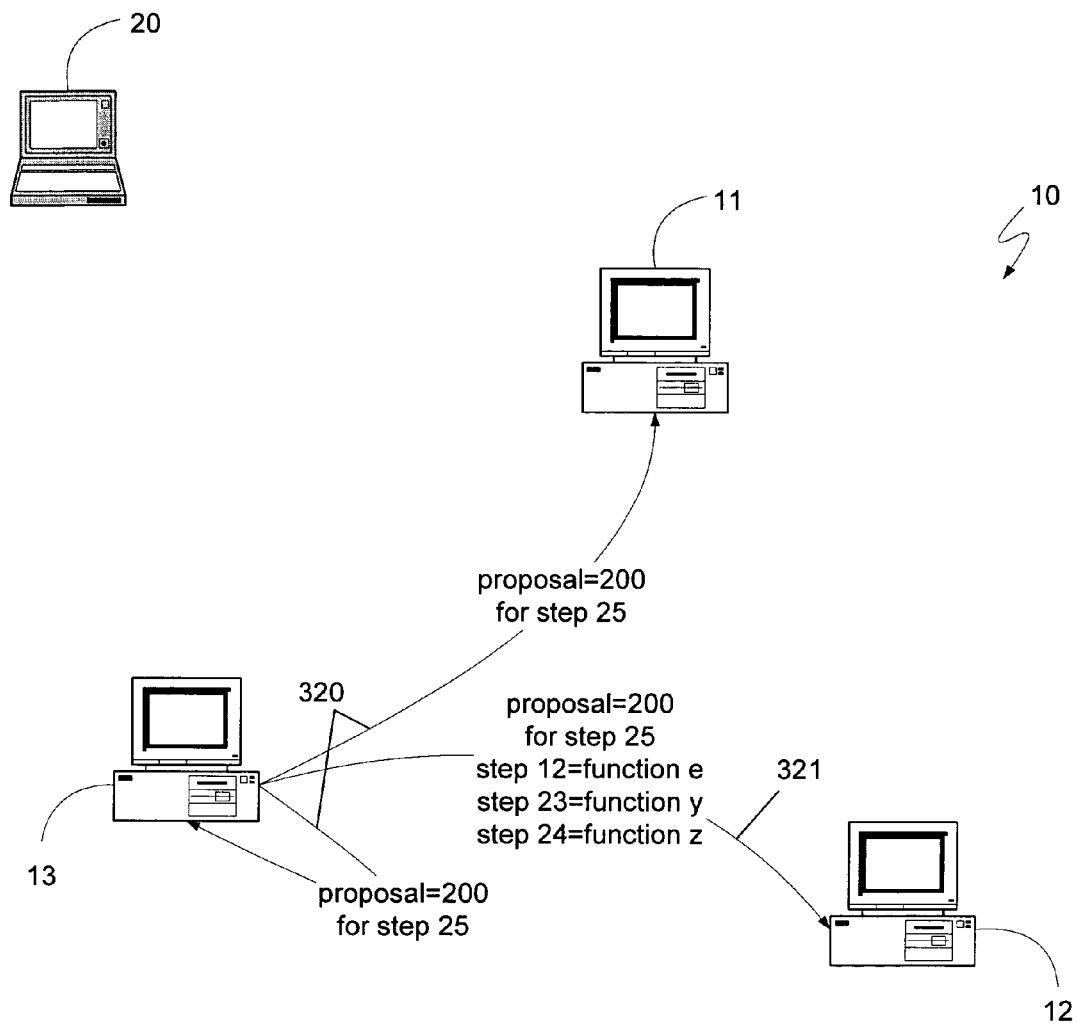
Figure 4C:

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. In addition, the leader 13 can also provide information regarding previously executed functions to any device that has not already executed all of the selected functions up until step 25. Therefore, as shown, the leader 13 can also send a message 321, indicating to device 12 that a function represented by the variable "e" was executed for step 12, and that functions represented by the variables "y" and "z" were executed for steps 23 and 24, respectively.

Figure 4D:
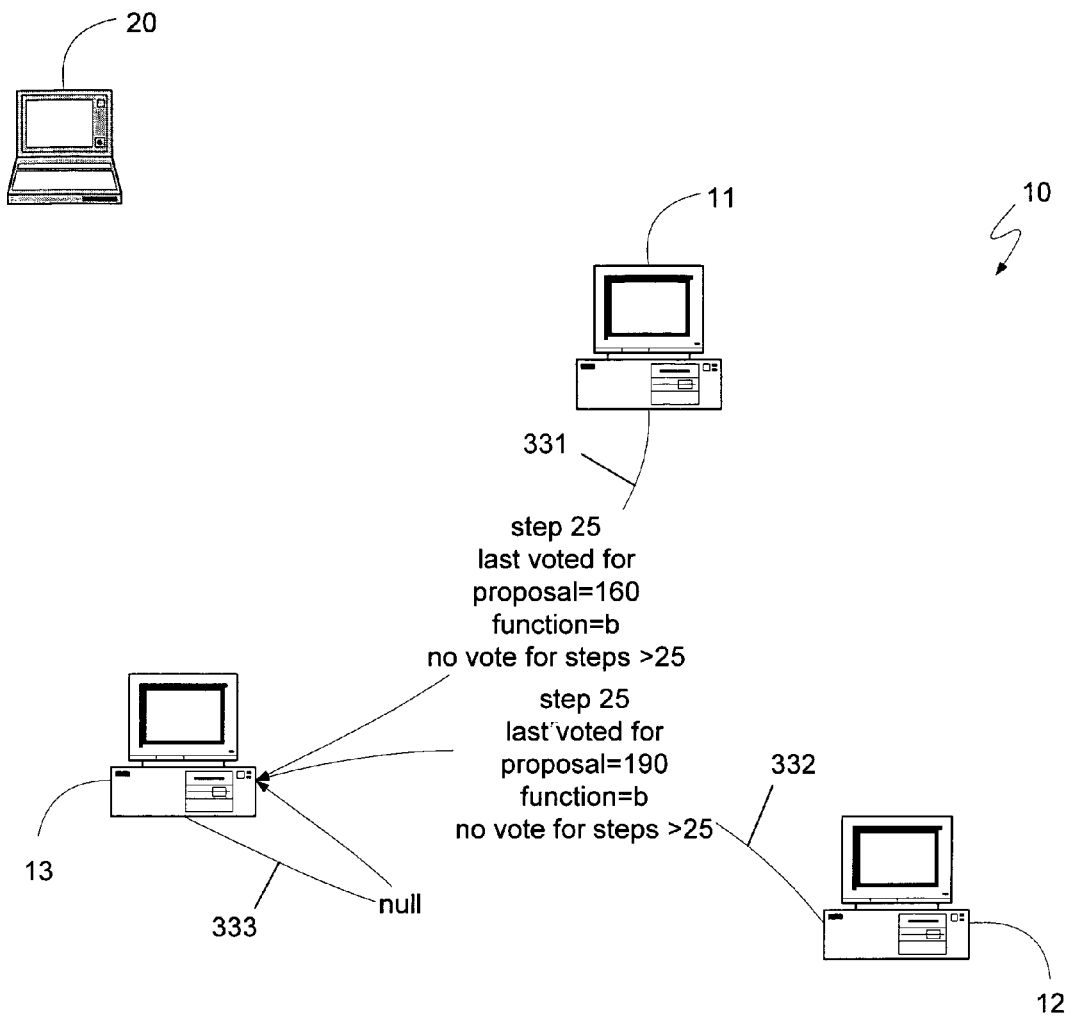

In FIG. 4d, then, the devices 11-13 can respond, in a manner similar to that shown above in FIG. 4b, with the exception that devices 11-13 need not inform device 13 of executed functions for steps 23 and 24, as device 13 has already learned of these steps and has sent proposal messages 320 and 321 referencing step 25. Furthermore, messages 331-333 can contain additional information, such as for additional proposals for which the devices may have voted for. For example, device 12 may have, sometime between the transmission of message 312 and message 332, voted for a proposal with a proposal number 190. Consequently, message 312 can indicate that device 12 may not have previously cast a vote for any proposal for step 25, but message 332 can indicate that device 12 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
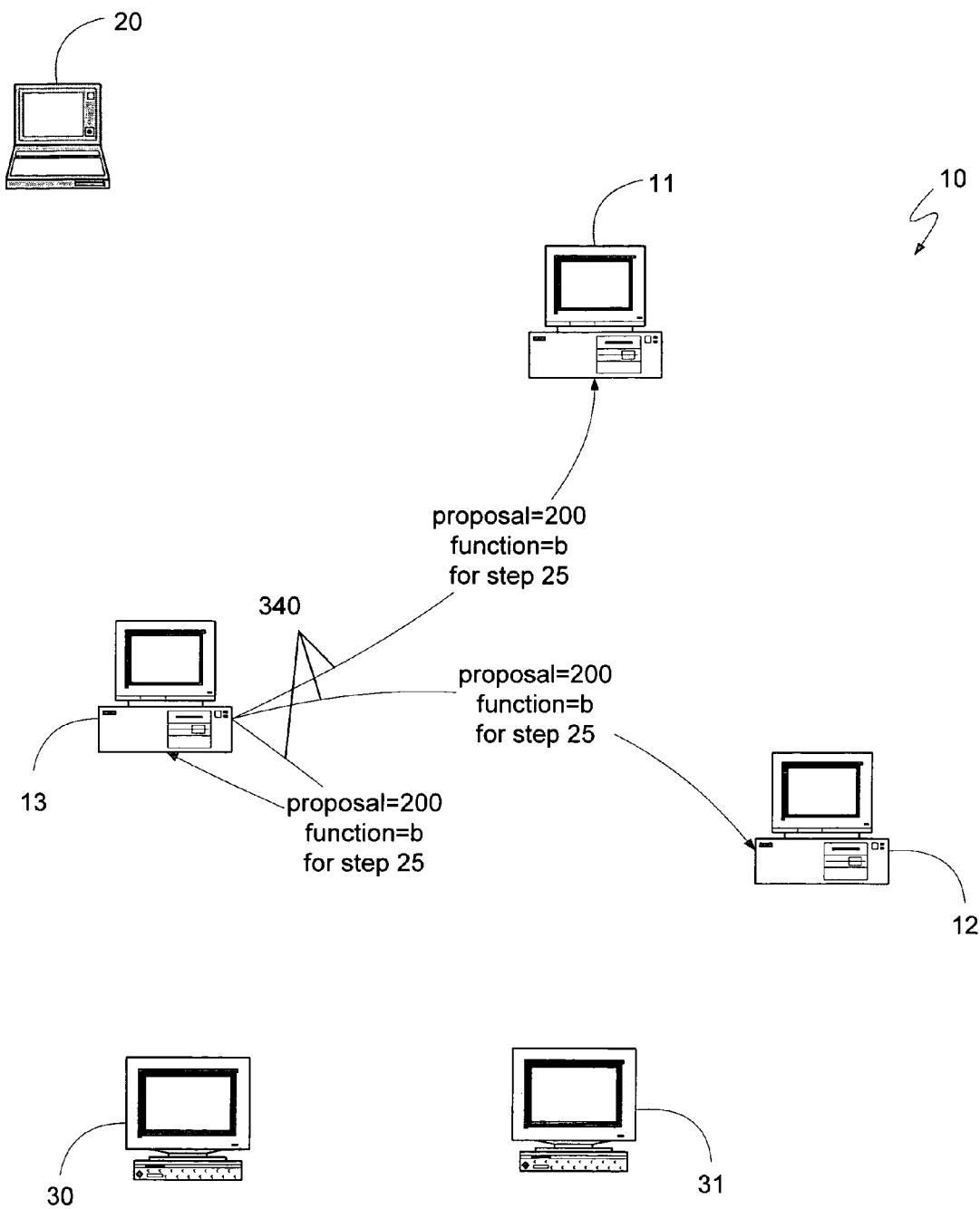

Turning to FIG. 4e, the leader 13 now has sufficient information with which to select a proposal to submit as proposal number 200, as illustrated by message 340, which requests that devices 11-13 vote on proposal 200, proposing that the system execute function "b" for step 25. As before, because devices 11 and 12, both members of a quorum, have previously voted for a proposal proposing the execution of function "b", and no other member of the quorum has voted for any larger numbered proposals, the leader 13 can propose function "b" for proposal number 200, despite the fact that the client 20 requested the execution of function "x" in message 300. In such a manner, the Paxos algorithm insures that previous functions that were proposed but not completed, such as because of a failure of one or more devices or their communications, can be executed in the proper order.

Figure 4F:
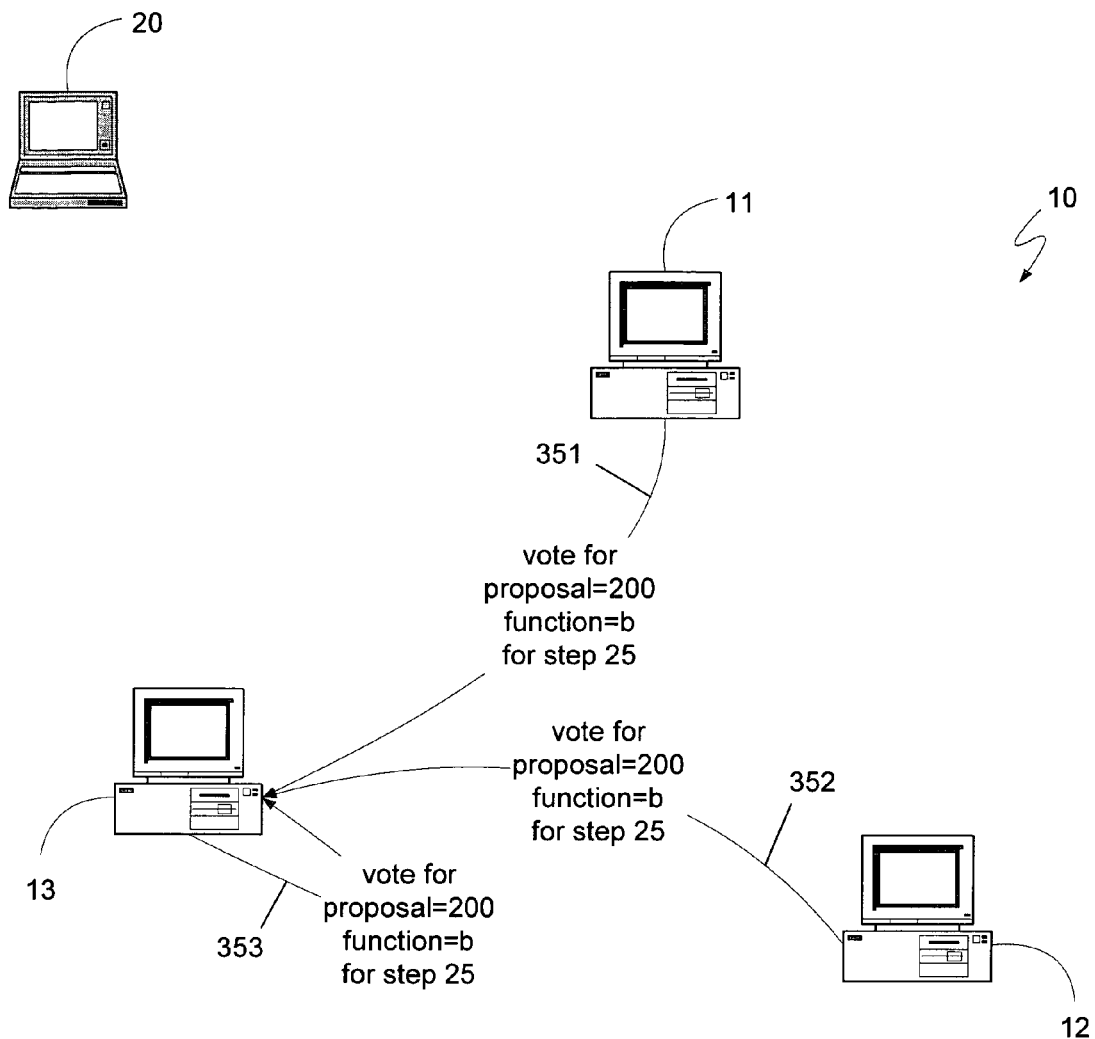
Figure 4G:
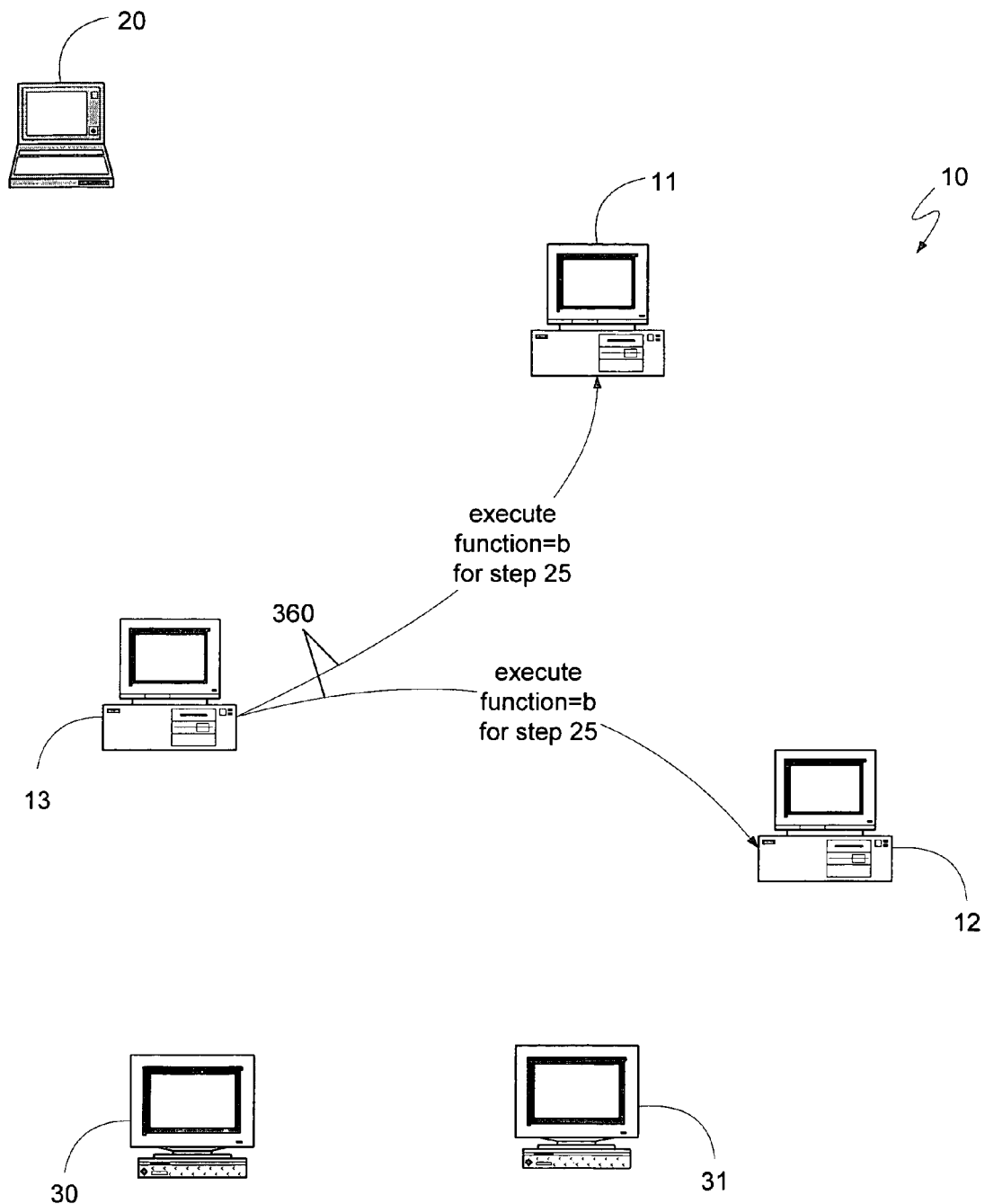

FIG. 4f illustrates devices 11-13 voting, for step 25, for proposal 200 proposing function "b" with messages 351-353, respectively. As before, a device can vote for a proposal so long as it has not promised to vote for a different proposal with a larger proposal number between the receipt of messages 320 and message 340. Once the leader 13 receives messages 351-353, it can transmit a message 360, as shown in FIG. 4g, instructing devices 11 and 12 to execute function "b" for step 25. The leader 13 can also execute the function itself, since it now knows that the function was selected by a quorum.

However, the function requested by the client 20 in message 300 has not yet been executed by the system 10 at the point in time illustrated in FIG. 4g. To have the system 10 execute the client's request, the leader 13 can perform an abbreviated version of the complete Paxos algorithm illustrated by FIGS. 3a-e and 4a-g above.

Conceptually, the Paxos algorithm described above can be divided into two general phases. The first phase comprises the leader learning of previous proposals that were voted for by the devices in the quorum. The first phase can contain one iteration of a proposal number suggestion by the leader and responses by other members of the quorum, as illustrated by FIGS. 3a and 3b, or multiple iterations of proposal number suggestions and responses, as illustrated by FIGS. 4a-d. The second phase comprises the leader submitting a proposed function for a vote, receiving the votes, and, if the proposal was voted on by a sufficient number of devices, instructing the devices to execute the agreed to function. Examples of the second phase are illustrated by FIGS. 3c-e and 4e-g.

Once the leader learns of other proposals, and finds a proposal number that is safe for all of the current and future steps, it does not need to solicit further information unless it fails, or another device attempts to become a leader. Therefore, the first phase of the Paxos algorithm may be performed less frequently, while the second phase may be performed repeatedly, with ever increasing step numbers, allowing a distributed computing system to agree upon and execute a series of functions and maintain an active running state.

Figure 5A:
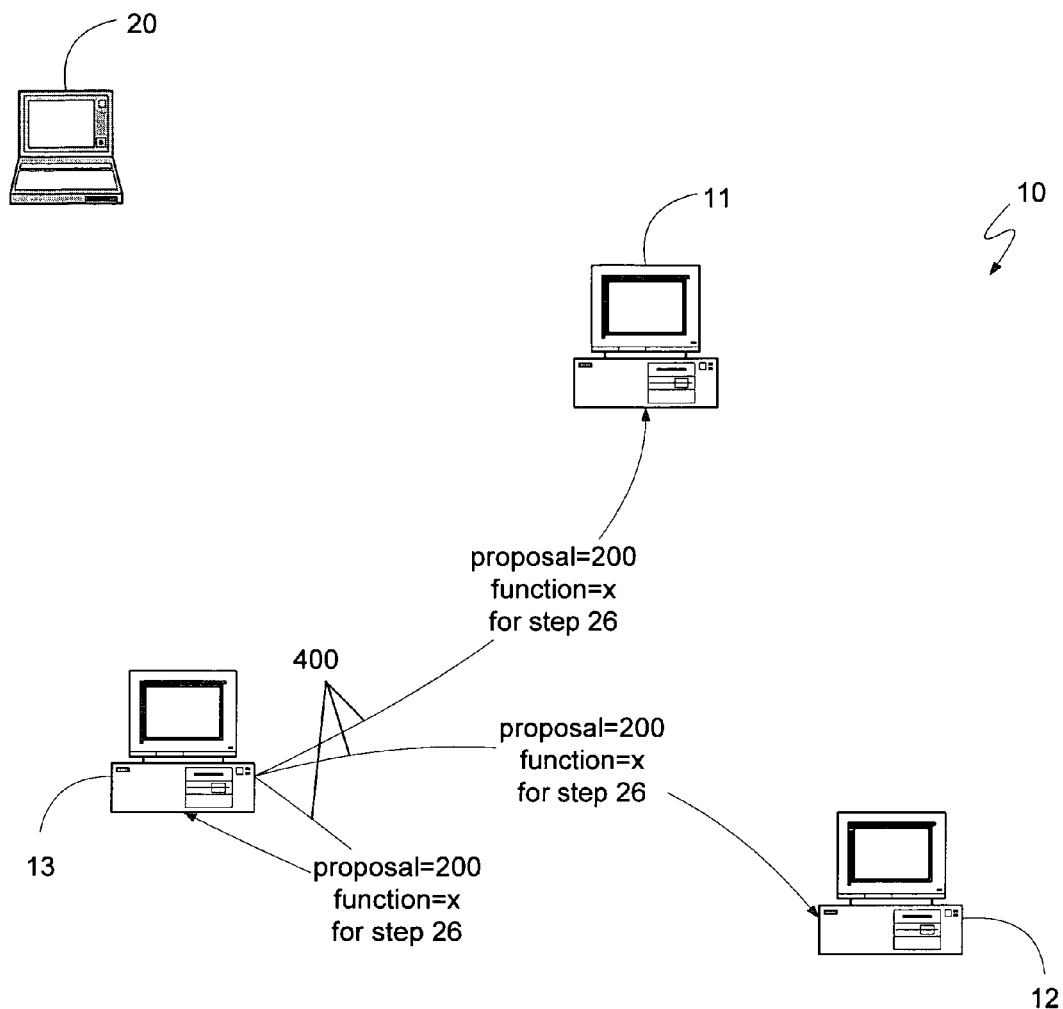
FIGS. 5a-c generally illustrate the operation of an abbreviated version of a multi-step consensus algorithm contemplated by an embodiment of the present invention.
Figure 5B:
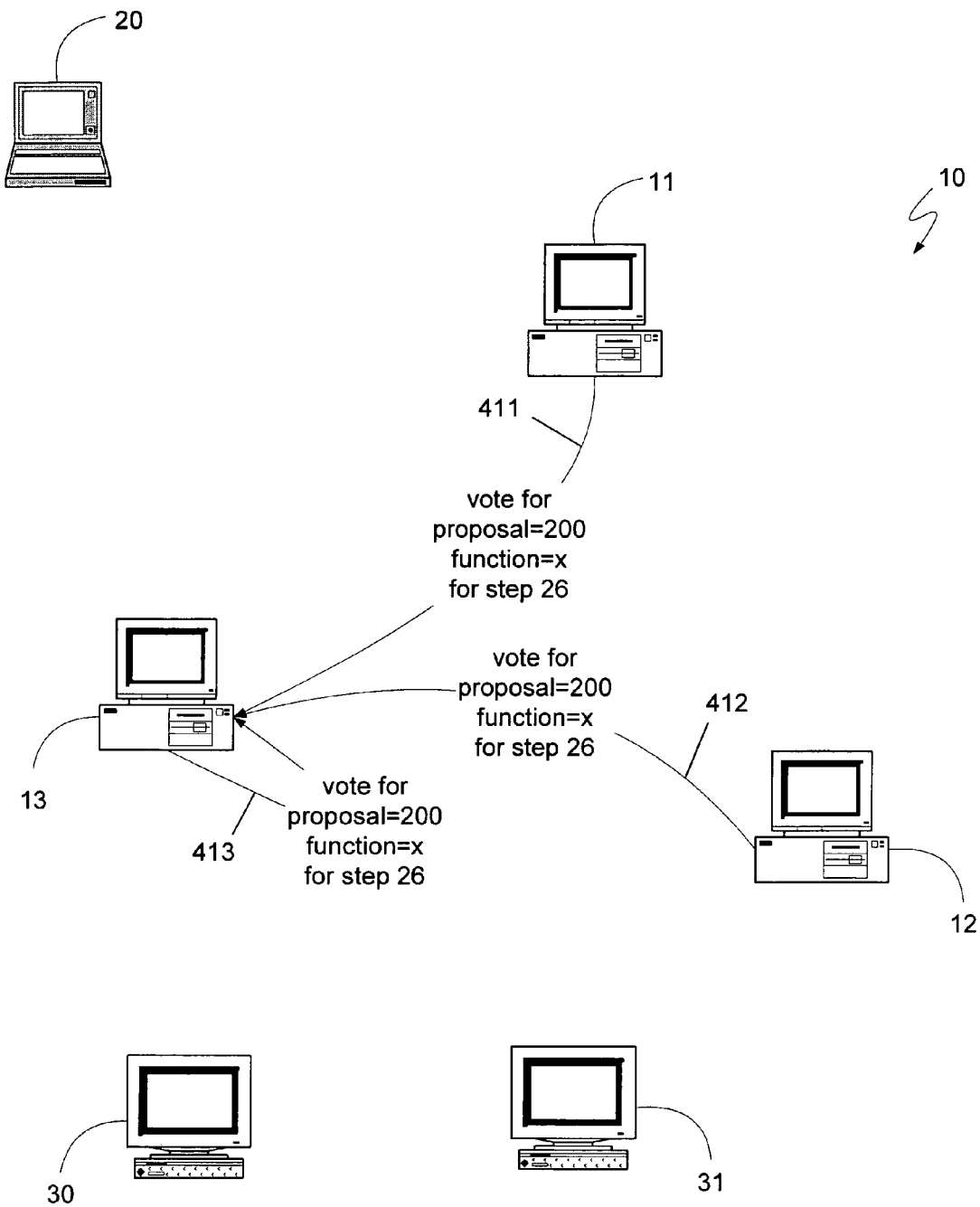
Figure 5C:
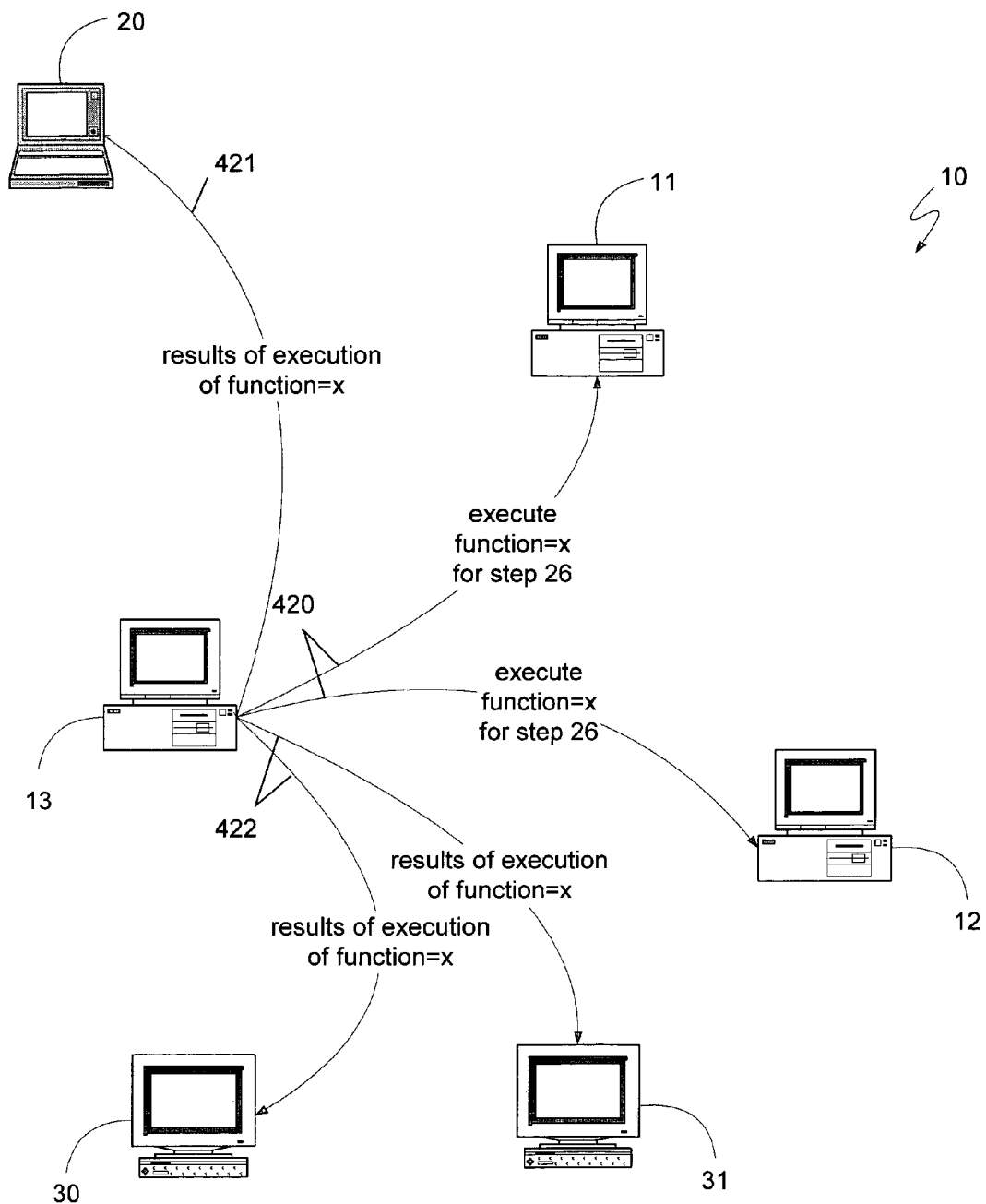

Turning to FIG. 5a, the exemplary distributed computing system 10 from FIGS. 4a-g is shown executing an additional step 26 subsequent to step 25 described in detail above. As a result of the first phase of the Paxos algorithm, as illustrated in FIGS. 4a-d, and described in detail above, the leader 13 already is aware that none of the devices 11-13 has voted for any proposals above step 25 and that proposal number 200 is, therefore, safe for all proposals for steps greater than step 25. Therefore, as shown in FIG. 5a, for step 26 the leader can initiate the second phase of the Paxos algorithm, without needing to perform the first phase again, and can send a message 400 soliciting votes for the execution of the function "x", which was requested by the client in message 300. Each of the devices 11-13 can then respond with votes, as shown in FIG. 5b with messages 411-413. Because each of the devices in the quorum has voted for the execution of the function, the leader 13 can signal, with message 420, as shown in Fig. 5c, that the devices 11 and 12 execute function "x" for step 26. In addition, because the leader 13 knows that the vote has succeeded, it can execute function "x" and can send the results of the execution of that function to the client as message 421, or to other interested computing devices, such as devices 30 and 31 as message 422. Messages 421 and 422 can be sent concurrently with message 420, or even before or after message 420.

As can be seen, once a leader has been established, and has learned the various highest numbered proposals voted on by the devices in the quorum for all upcoming step numbers, the leader can solicit proposals for a vote without cycling through the first phase of the Paxos algorithm. While the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

The devices implementing the steps of the Paxos algorithm described above can maintain variables storing information used in the algorithm. For example, for each step for which the devices does not know which function was chosen, the device can store the proposal number of the proposal with the largest proposal number for which they responded to, the proposal number of the proposal with the largest proposal number they voted for, the value proposed by the proposal with the largest proposal number for which they voted, and, if the device is a leader, it can additionally store the proposal number for the last proposal it issued. Additionally, devices can record which function was selected for all of the steps for which they have such information. Alternatively, as described above, a device could store a snapshot of its state at a given time, and the functions executed only since that time. Such variables can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament" by Leslie Lamport, published in ACM Transactions on Computer Systems, volume 16, number 2 on pages 133-169, dated May 1998, which is hereby incorporated by reference in its entirety.

Simplified Paxos Algorithm

Figure 6A:
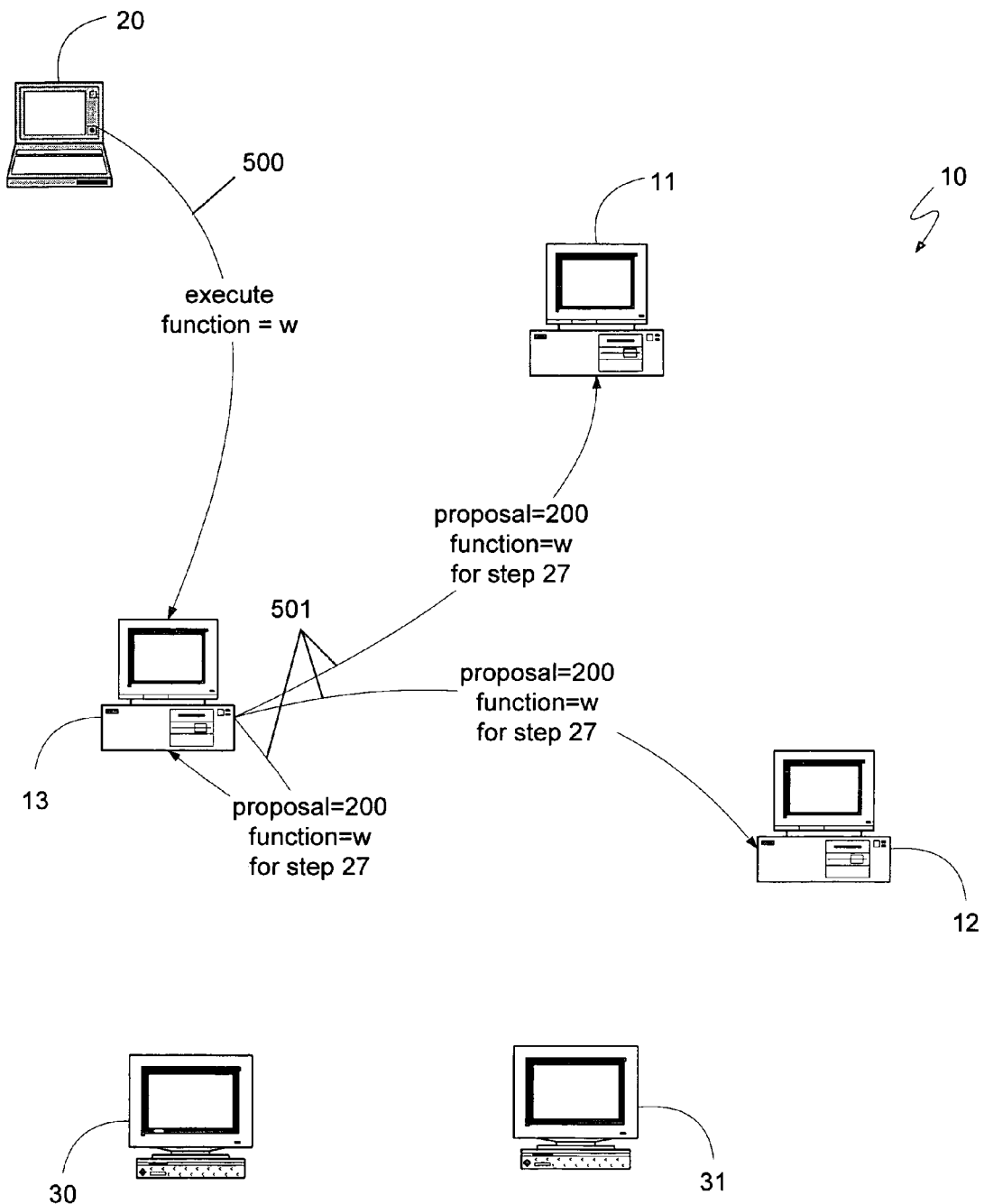
FIGS. 6a-c generally illustrate the operation of an abbreviated version of a multi-step consensus algorithm contemplated by an embodiment of the present invention.
Figure 6B:
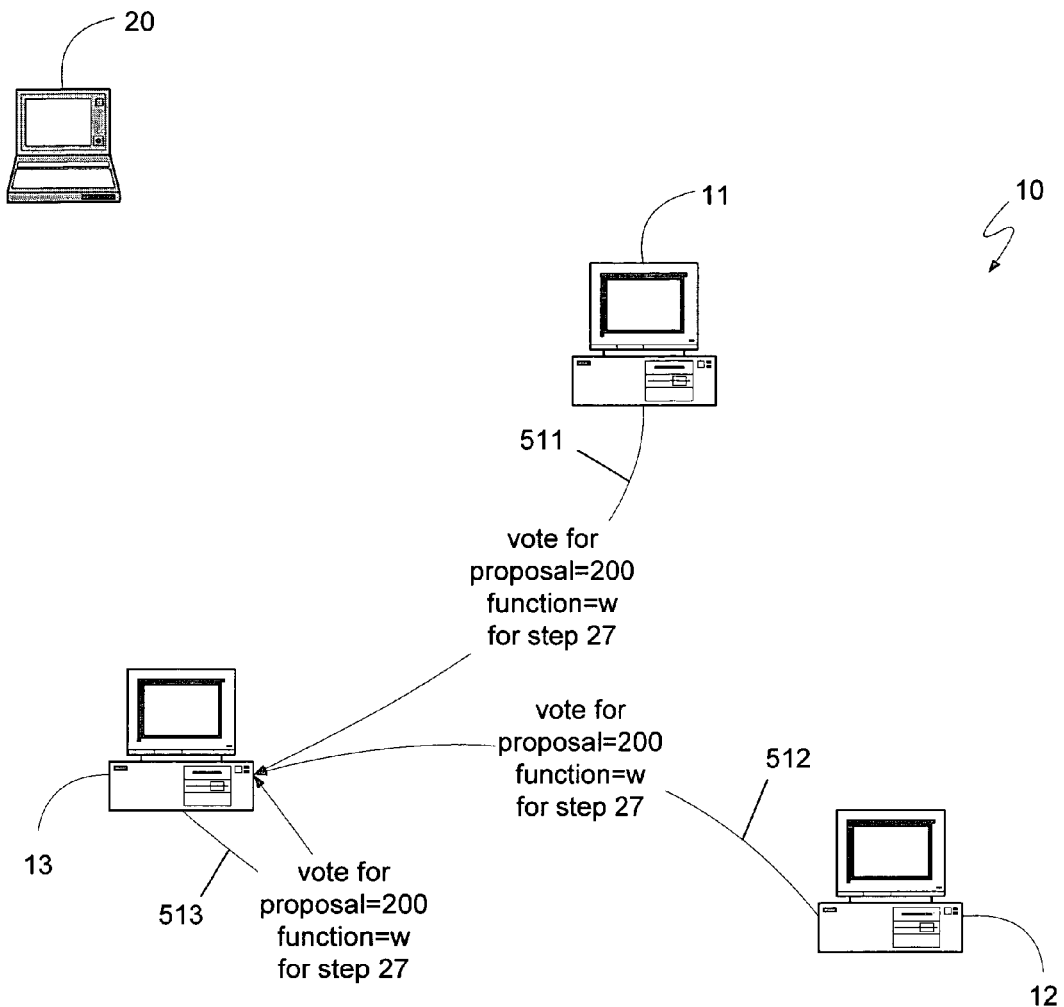
Figure 6C:
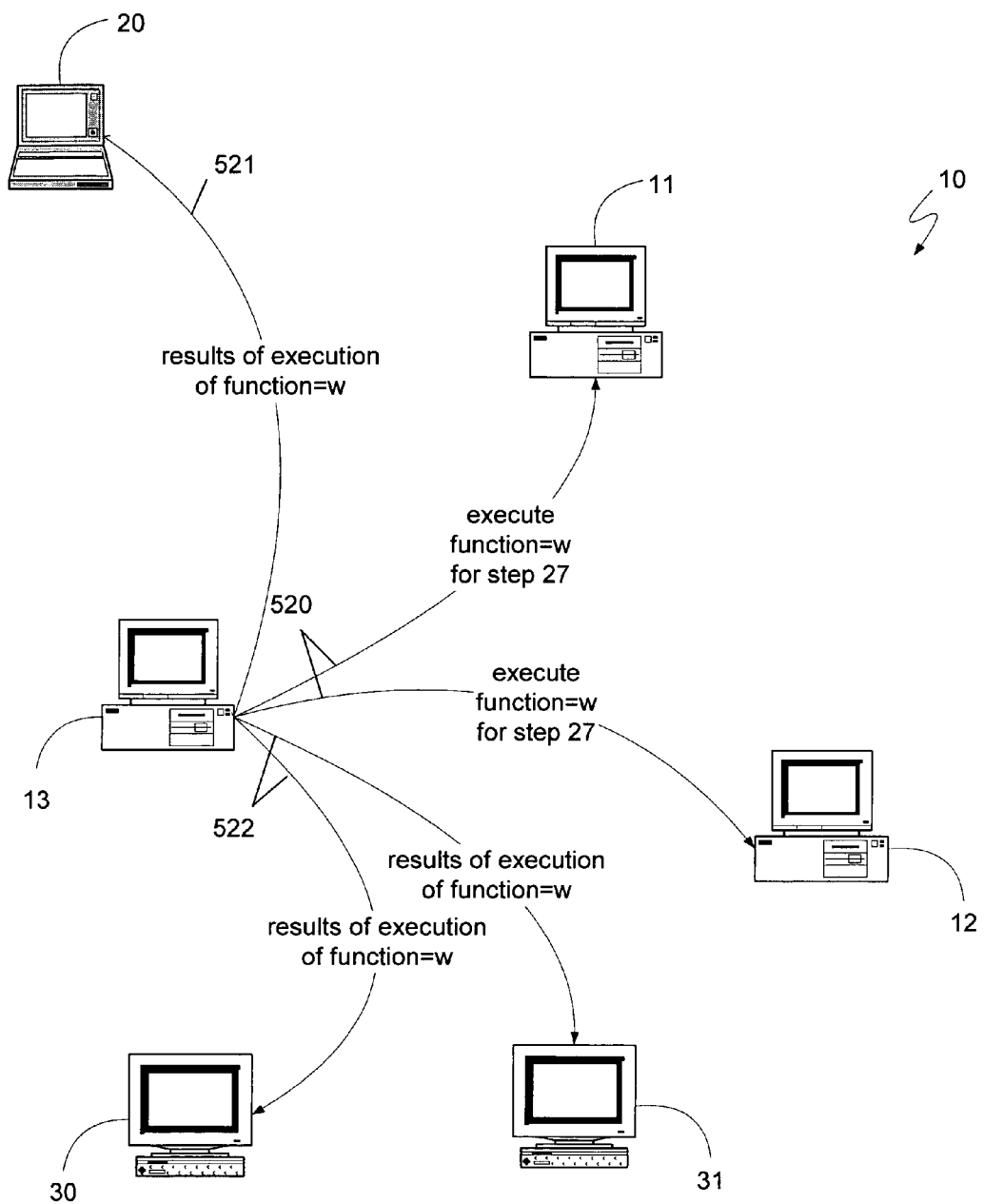

As can be seen from the above detailed description of the standard Paxos algorithm, a series of message delays can be introduced between the transmission of a client's request to a distributed computing system implementing the Paxos algorithm, and the transmission of a response to the client's request from the system. Message delays can be introduced even if the device receiving the client's request is already a leader device that has already completed the first phase of the standard Paxos algorithm. For example, turning to FIG. 6a, the distributed computing system 10 of the previous figures is shown, with the previous leader 13 receiving a client request 500, from the client 20, which requests that the system execute a function represented by the variable "w". Because the leader 13 has already performed the first phase of the Paxos algorithm, and no other device has attempted to solicit votes, the leader need only perform the second phase of the Paxos algorithm to have the system 10 execute the client's request 500. Therefore, upon receiving the client's request 500, the leader 13 can send a message 501 soliciting votes for the execution of the function "w" as proposal number 200 for the next step of the system, which in the current example is step 27. The transmission of message 501 can introduce one message delay. Each of the devices 11-13 can then respond with votes, as shown in FIG. 6b with messages 511-513. The transmission of message 511-513 can introduce another message delay. Because each of the devices in the quorum has voted for the execution of the function, the leader 13 can signal, with message 520, as shown in FIG. 6c, that the devices 11 and 12 execute function "w" for step 27. In addition, because the leader 13 knows that the vote has succeeded, it can execute function "w" and can send the results of the execution of that function to the client as message 521, or to other interested computing devices, such as devices 30 and 31 as message 522. Therefore, the standard Paxos algorithm can introduce at least two message delays between the receipt of the client's request message 500 and the transmission of the reply message 521 to the client.

In one embodiment of the present invention, at least one message delay can be avoided by modifying the second phase of the standard Paxos algorithm. In a distributed computing system, such as system 10, comprising three computing devices, any two devices can form a majority. Because any two majorities have at least one device in common, any two devices in a three device system can also be a quorum for the purposes of executing the Paxos algorithm. Thus, if any two devices agree on the execution of a proposed function, the proposed function can be selected and executed by the system. The leader can be one device of this two device quorum. Therefore, if either of the other two devices votes for the execution of a proposed function, a quorum has selected that function.

One message delay can be avoided if the leader transmits, together with a request to vote for a particular function, an indication of the leader's vote for that function. When another device receives such a message, it can, by itself, and without any further messages, complete a quorum voting for the execution of the proposed function. Therefore, if the device determines that it should vote for the proposed function, and it has already received the leader's vote for the same proposed function, it can also determine that a quorum, comprising itself and the leader, has voted for the execution of the function. Because a quorum has voted for the execution of the function, the device can, without receiving any further messages, safely execute the function. Once the device has executed the function, it can transmit the results back to the client, or to any other interested device, thereby eliminating one message delay as compared to the standard Paxos algorithm.

Figure 7A:
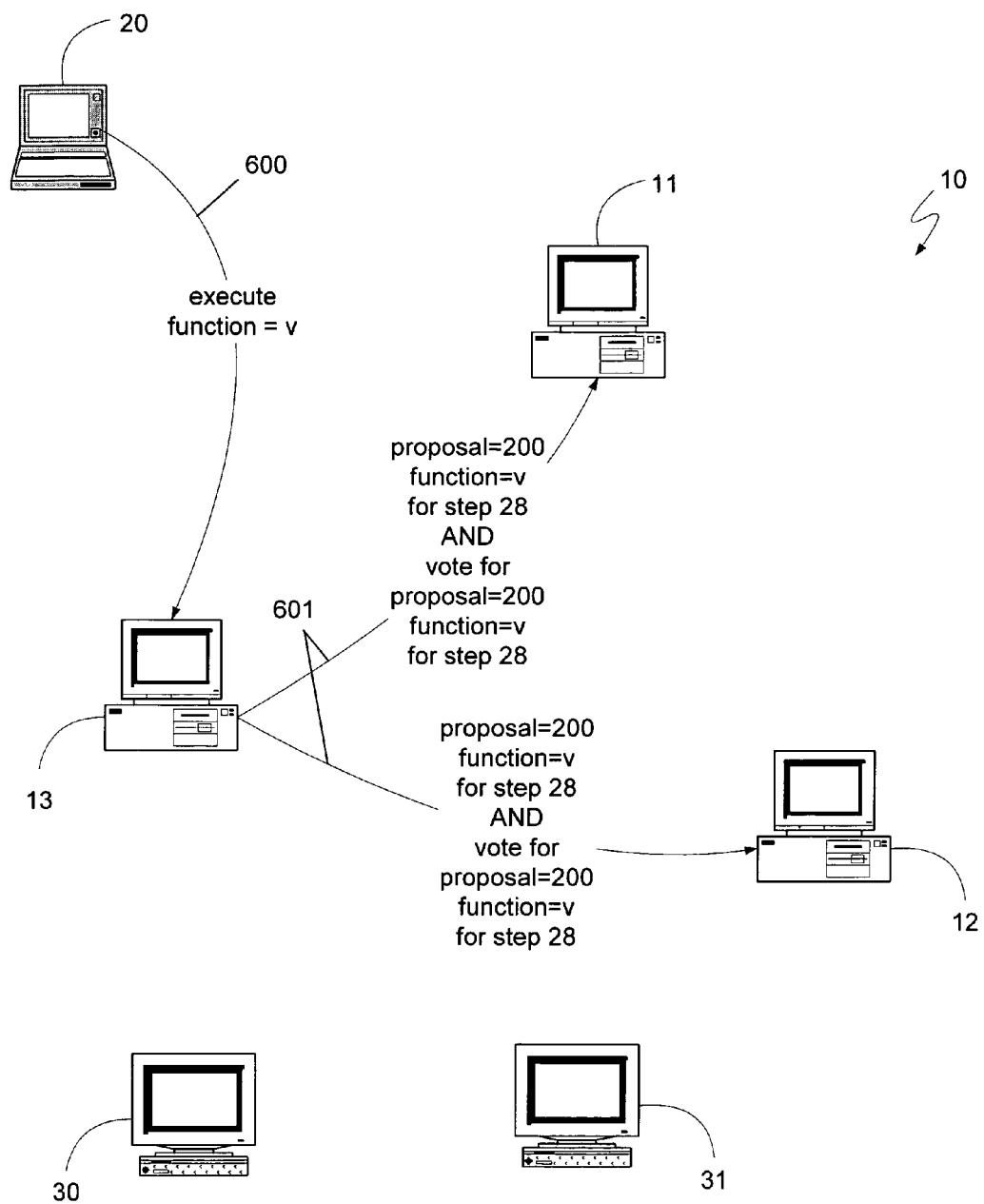
FIGS. 7a-b generally illustrate the operation of a simplified consensus algorithm contemplated by an embodiment of the present invention.

Turning to FIG. 7a, the operation of one embodiment of the present invention is shown with reference to the system 10 of the previous figures. As in FIG. 6a, the leader 13 can receive a client's request, shown as message 600 in FIG. 7a, to execute a function represented by the variable "v". The leader 13 can then transmit, to both devices 11 and 12, a message 601 comprising not only the request for a vote on the proposed function, but also comprising an indication of the leader's vote in favor of the proposed function. Thus, the message 601 in FIG. 7a contains additional information not present in the leader's message 501 from FIG. 6a above. Specifically, message 601 also contains information that the leader 13 did not transmit until message 513 in FIG. 6b above.

Figure 7B:
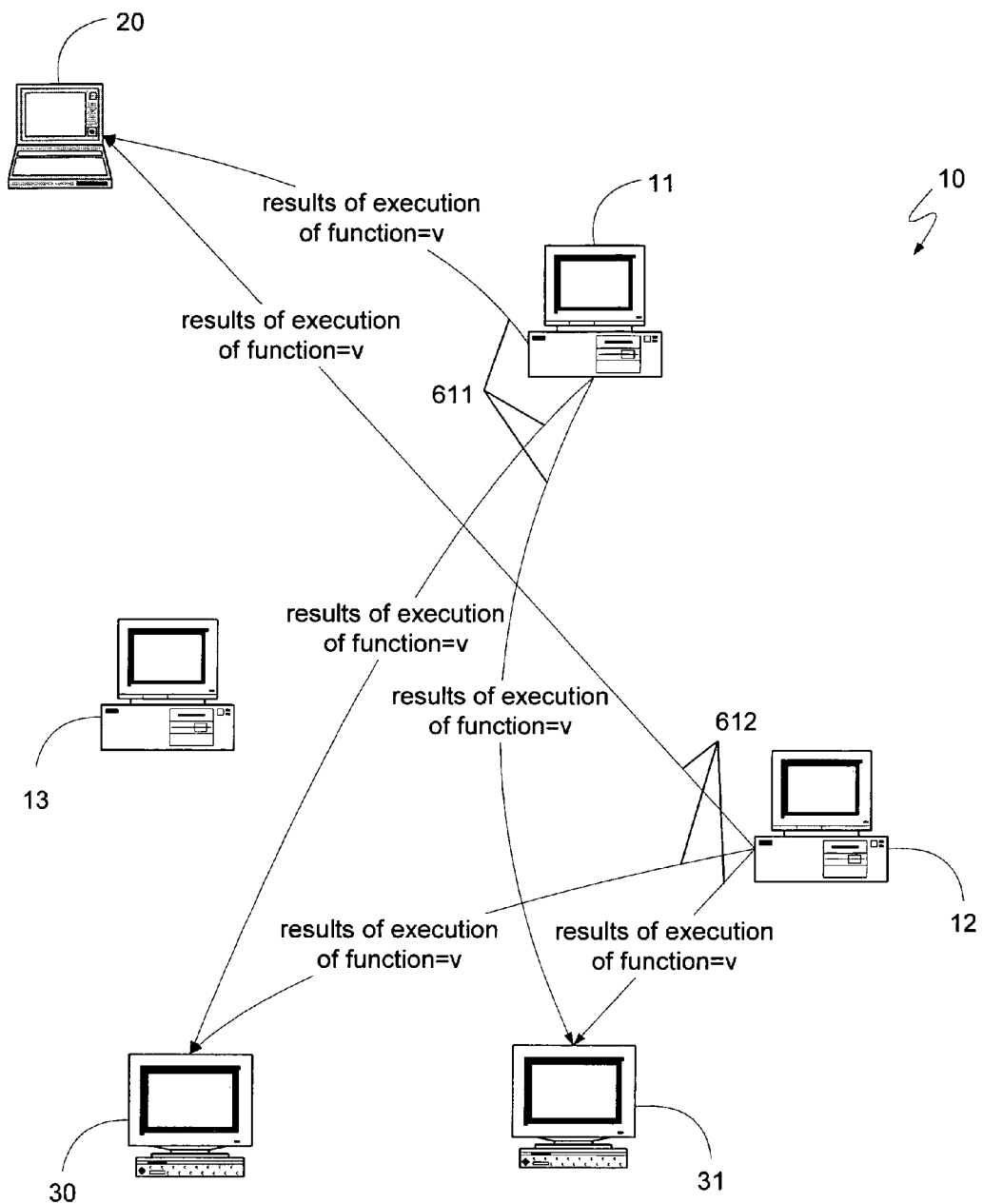

Turning to FIG. 7b, because devices 11 and 12 are aware that device 13 has already voted for the proposed function, and because any two devices constitute a quorum in the system 10, devices 11 and 12 can independently execute the proposed function if they were to vote for it. Thus, as shown in FIG. 7b, devices 11 and 12 can decide to vote for the proposed function. Since devices 11 and 12 are each aware of their own vote, and they are each also aware of device 13's vote in favor of the proposed function, devices 11 and 12 independently know that a quorum has voted for the proposed function and that it is, therefore, safe to execute the function. Devices 11 and 12 can therefore execute the function and provide the results of the execution of function "v" directly to the client 20, and to any other computing devices, with messages 611 and 612, as shown in FIG. 7b. Therefore, as can be seen, by sending the vote together with the proposal, the only message delay between the client's request 600 and the system's response, in the form of messages 611 or 612, was the delay in sending message 601.

Figure 8A:
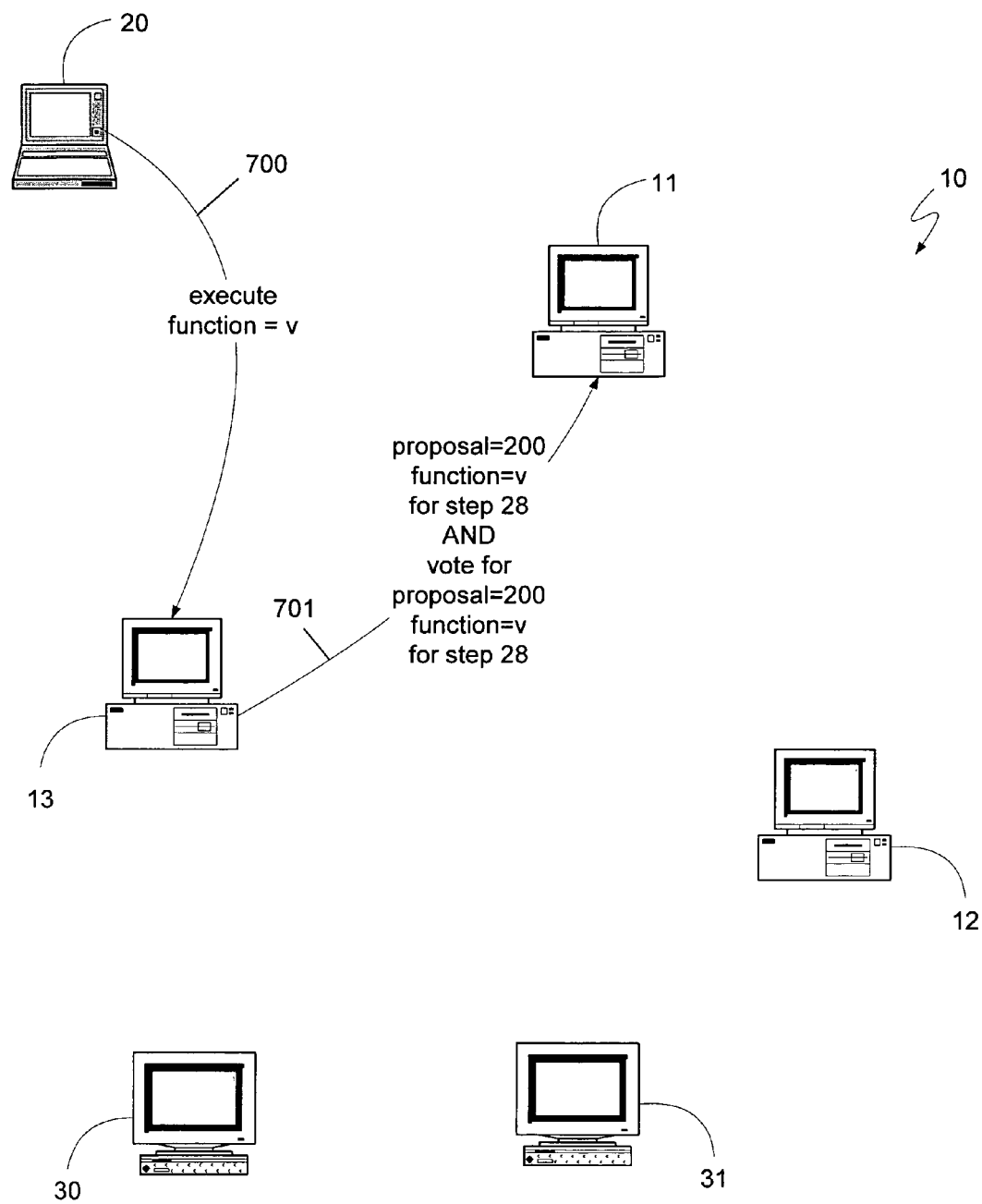
FIGS. 8a-b generally illustrate the operation of another simplified consensus algorithm contemplated by an embodiment of the present invention.
Figure 8B:
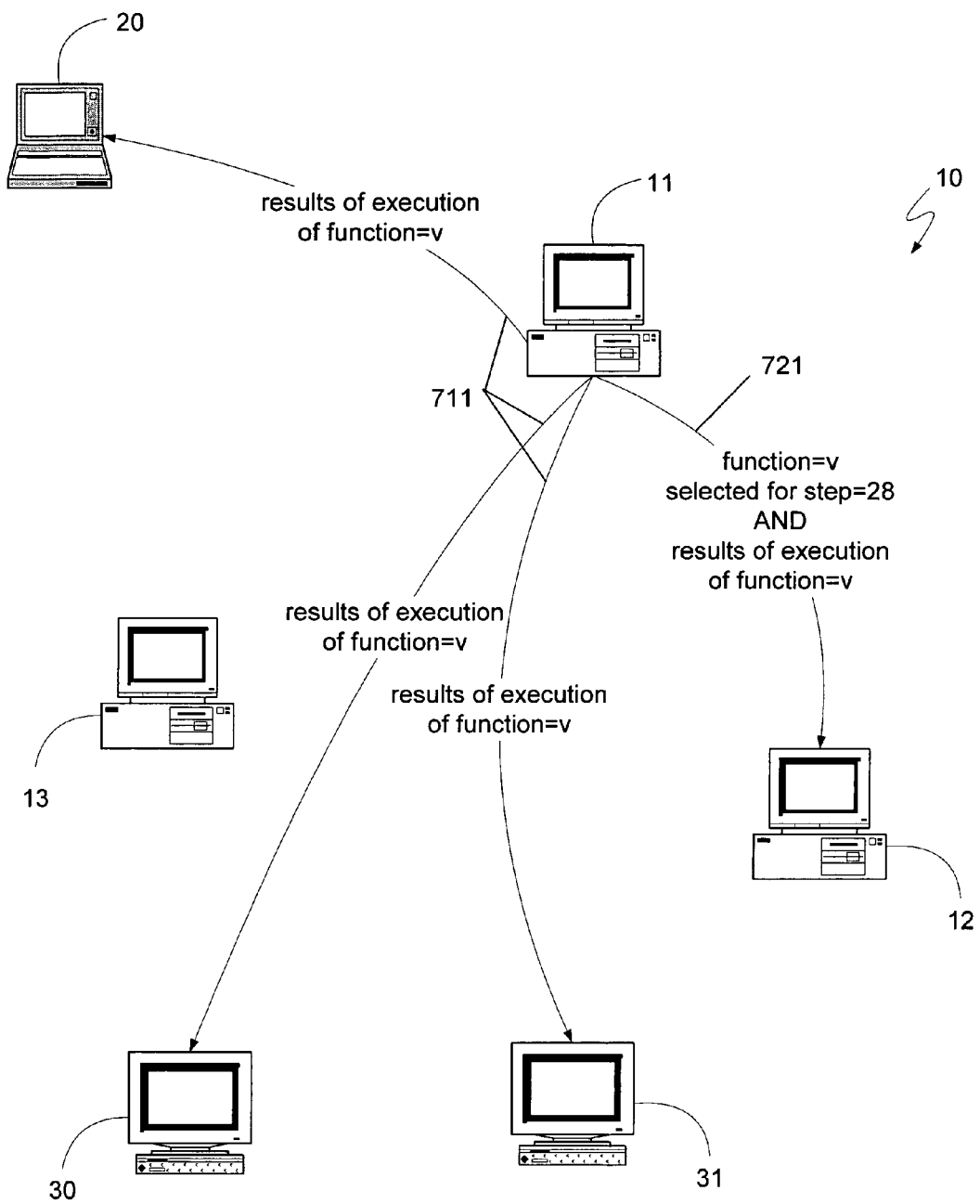

In another embodiment contemplated by the present invention, the leader 13 selects only one other device in the system 10 to complete the quorum and announce the results of the execution of the requested function. Therefore, turning to FIG. 8a, an alternative to FIG. 7a is shown. Specifically, as shown in FIG. 8a, when the leader 13 receives the client's request 700, it can send only one message 701, comprising a request for a vote on the requested function, and an indication of the leader's vote for that function, to device 11. As above, if device 11 decides to vote for the function, then it knows that a quorum, comprising itself and the leader, has voted for the function, and it can safely execute the function and provide the results to the client 20 and any other interested device. Thus, as shown in FIG. 8b, which illustrates an alternative to FIG. 7b, device 11 can inform not only the client 20 and other interested devices 30 and 31 of the results of the execution of the requested function, but device 11 can also inform device 12 of the results of the executed function. However, because device 12 can seek to maintain a current copy of the system's state, the device 11 can also provide an indication of the function that was selected and for which step it was selected. Thus, while message 711, sent to the client 20 and other interested devices 30 and 31 need only contain the results of the execution of the selected function, device 12 can receive message 721 indicating that the function "v" was selected for step 28, and providing the results of the execution of function "v".

In either of the embodiments illustrated in FIGS. 7a and b and 8a and b, the devices executing the requested function can transmit the fact that function "v" was chosen, and provide the results of the execution of function "v", to the leader 13 to enable the leader to maintain a current copy of the system's state. Alternatively, the leader 13 does not need to maintain the system's state, removing the need for the devices executing the function to transmit further messages to the leader.

Whether the leader maintains the system's state or not, so long as two copies of the system's state are maintained, the system 10 can tolerate a failure. For example, if the leader 13 does not maintain a copy of the system's state, and devices 11 and 12 do maintain copies, if either device 11 or 12 were to fail the, system could continue to operate with just the leader 13 and one of the two devices 11 or 12, whichever was operational. The messages transmitted would be analogous to those illustrated in FIGS. 8a and 8b, where the leader sends a message to only one device.

To minimize the number of messages transmitted among the devices of system 10, an embodiment of the present invention contemplates caching result messages and transmitting them as a batch message to the leader, or to any other device that may not need to know the results of the execution of the function in an expedited manner. Thus, if the leader did maintain a backup copy of the system's state, result messages, such as message 711 shown in FIG. 8b, could be cached at the transmitting device and, after a predetermined time interval or, alternatively, after a sufficient number of messages were cached, the result messages could be sent to the leader as a batch message containing multiple result messages. Such a technique could be similarly used for messages to other devices, such as devices 30 and 31. By caching result messages and transmitting them as a batch message after a predetermined time interval, the number of messages sent can be reduced, in turn, reducing network congestion and the load at the network interface of the transmitting device.

Because the leader may not receive the results of the execution of the requested function, other mechanisms may be used to verify that the other devices, such as devices 11 and 12, actually received the message containing the request for a vote and the leader's vote, that was sent by the leader. In one embodiment contemplated by the present invention, devices 11 and 12 can send small acknowledgement messages to the leader 13 to acknowledge that they received the leader's message. Furthermore, the acknowledgement messages can also be cached and transmitted as a batch message after a predetermined time interval in the manner described above. In another embodiment contemplated by the present invention, a reliable underlying transport mechanism can be used. As will be known by those skilled in the art, a reliable transport mechanism independently verifies the transmission of messages, and independently caches and retransmits messages, if necessary. Consequently, the use of a reliable underlying transport mechanism removes the need for explicit message authentication as part of the consensus algorithm.

The more efficient Paxos algorithm, described in detail above, retains the fault-tolerant properties of the standard Paxos algorithm, also described in detail above. Specifically, the three device system 10 shown in the figures can tolerate one failure. For example, if device 12 were to fail, the system could continue to operate in the manner described above with reference to FIGS. 8a and 8b, because any two devices, namely the leader 13 and device 11 in the present example, constitute a quorum and can select functions to execute.

If device 13 were to fail, or if one of the devices 11 or 12 attempted to become a leader and submit a proposal to the system 10, the first phase of the standard Paxos algorithm, described in detail above, may have to be performed for a leader device to learn of previous proposals and to determine an appropriate proposal number. However, as explained above, under generally anticipated operating conditions, the first phase of the Paxos algorithm is performed less frequently than the second phase of the Paxos algorithm. Therefore, by removing a message delay from the second phase of the Paxos algorithm, the algorithm described above will result in faster responses to the client, under generally anticipated operating conditions, even though the first phase of the standard Paxos algorithm may still occasionally be performed to provide information to the leader.

Simplified Paxos Algorithm with Inexpensive Devices

As explained above, the Paxos algorithm can be used to provide fault-tolerant distributed computing using a system comprised of any type of computing devices. By way of example only, the distributed computing system could be comprised of high-speed dedicated server computing devices providing redundancy on a worldwide scale or the system could be comprised exclusively of unused resources from personal computing devices providing inexpensive redundant processing and storage to income-limited organizations or research institutions. However, if the quorum of computing devices needed to select functions to execute is itself selected by a quorum of computing devices, further computing resources can be saved. Specifically, the above described algorithms can be implemented by a distributed computing system in which one device can have very low processing power or storage capabilities. In such a manner, a computing budget can be mostly allocated to the other devices of the distributed computing system, enabling the purchase of more powerful computing devices, while only a minimal amount of monetary resources needs to be allocated to the one device that can have only minimal processing power or storage capabilities.

Figure 9A:
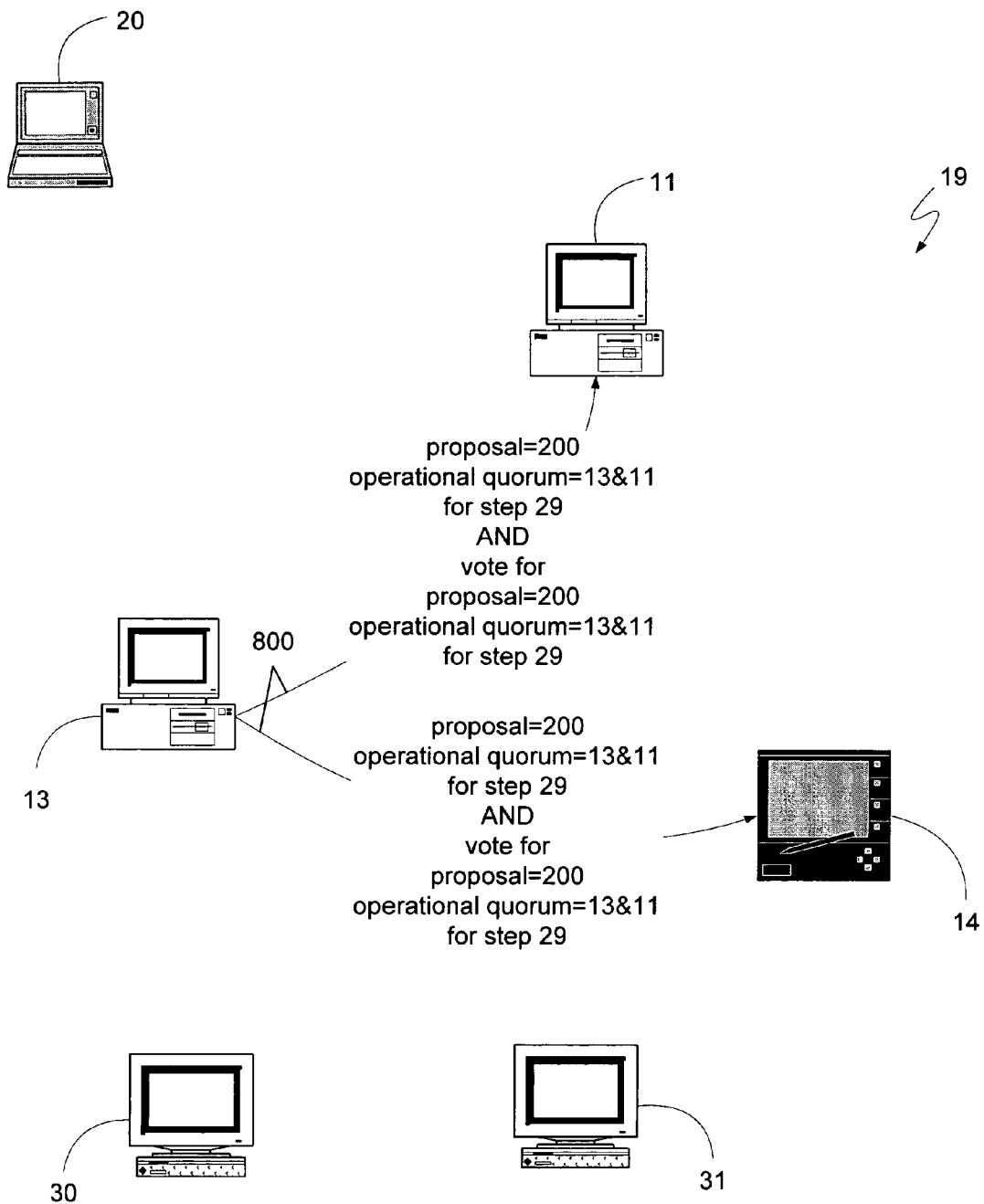
FIGS. 9a-b generally illustrate the operation of a simplified consensus algorithm with an inexpensive device contemplated by an embodiment of the present invention.

Turning to FIG. 9a, a distributed computing system 19 is shown, having two computing devices 11 and 13 and an inexpensive computing device 14, shown in the form of a personal digital assistant (PDA). While device 14 is shown as a PDA, those of skill in the art will appreciate that it can be any type of computing device, just as devices 11 and 13 can be any type of computing device. However, the most efficient use of monetary resources can be achieved by purchasing more powerful computing devices 11 and 13 and purchasing a less powerful computing device 12, including devices such as PDAs, programmable calculators, or even digital wristwatches.

Prior to submitting a proposal for a vote, a leader 13 can attempt to select the operational quorum which will vote on and, if selected, perform the proposed function. The selection of an operational quorum can occur in an analogous manner to the selection of proposed functions described in detail above. Because device 13 has already established itself as a leader device, as described in detail above, it can proceed to propose an operational quorum. Thus, as shown in FIG. 9a, the leader 13 can send a request for a vote for a particular operational quorum, together with the leader's vote for the proposed operational quorum. In the particular example illustrated in FIG. 9a, the leader 13 proposes an operational quorum comprising devices 11 and 13, and sends the proposal and its vote to both of the devices 11 and 14.

Figure 9B:
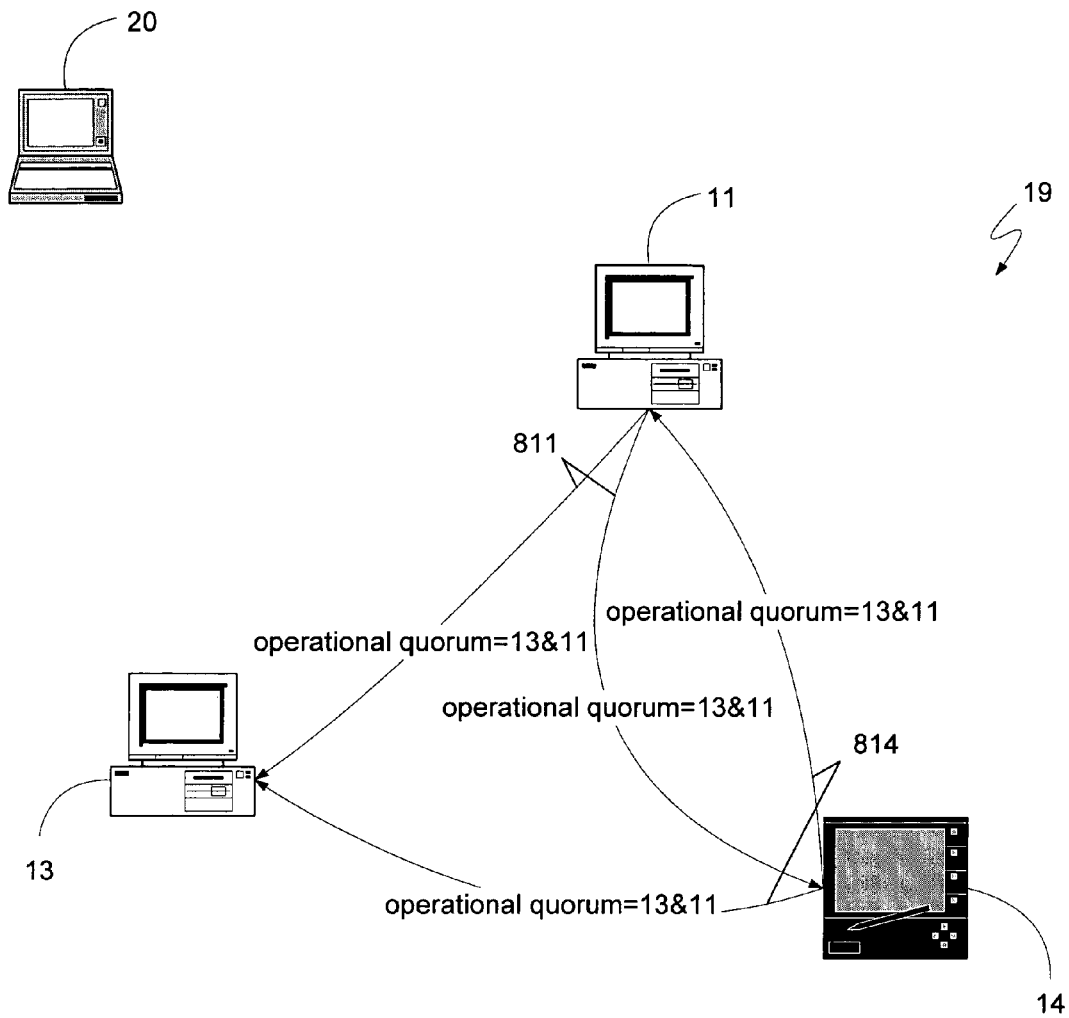

Turning to FIG. 9b, each of the devices 11 and 14 are shown agreeing to the proposed operational quorum, and notifying the other devices of the system 19 of their agreement. As explained above, another embodiment contemplated by the present invention allows device 13 to send only one message 800, such as to device 14 only. In such a case, device 14 could send message 814 to devices 11 and 13 informing them of the selection of the operational quorum.

Figure 10A:
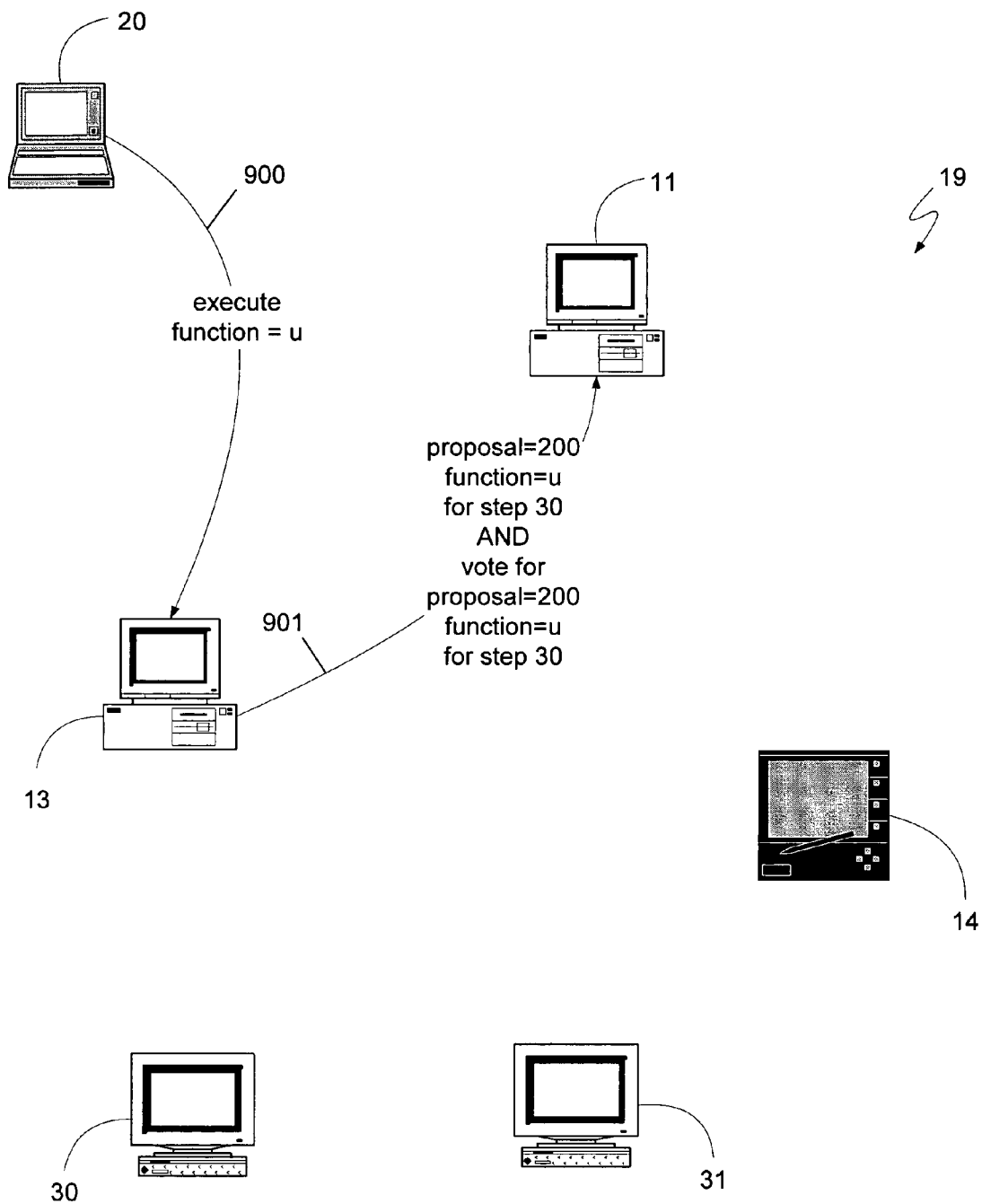
FIGS. 10a-b generally illustrate the further operation of a simplified consensus algorithm with an inexpensive device contemplated by an embodiment of the present invention.

Once the operational quorum is selected, it can be used to vote for, and execute, proposed functions. Therefore, turning to FIG. 10a, the leader 13 can receive a request 900, from the client 20, to execute a function represented by the variable "u". As before the leader 13 can send a proposal to execute the requested function together with the leader's vote for the proposal in a message 901. However, because the operational quorum has been selected as devices 11 and 13, device 13 need only send message 901 to device 11.

Figure 10B:
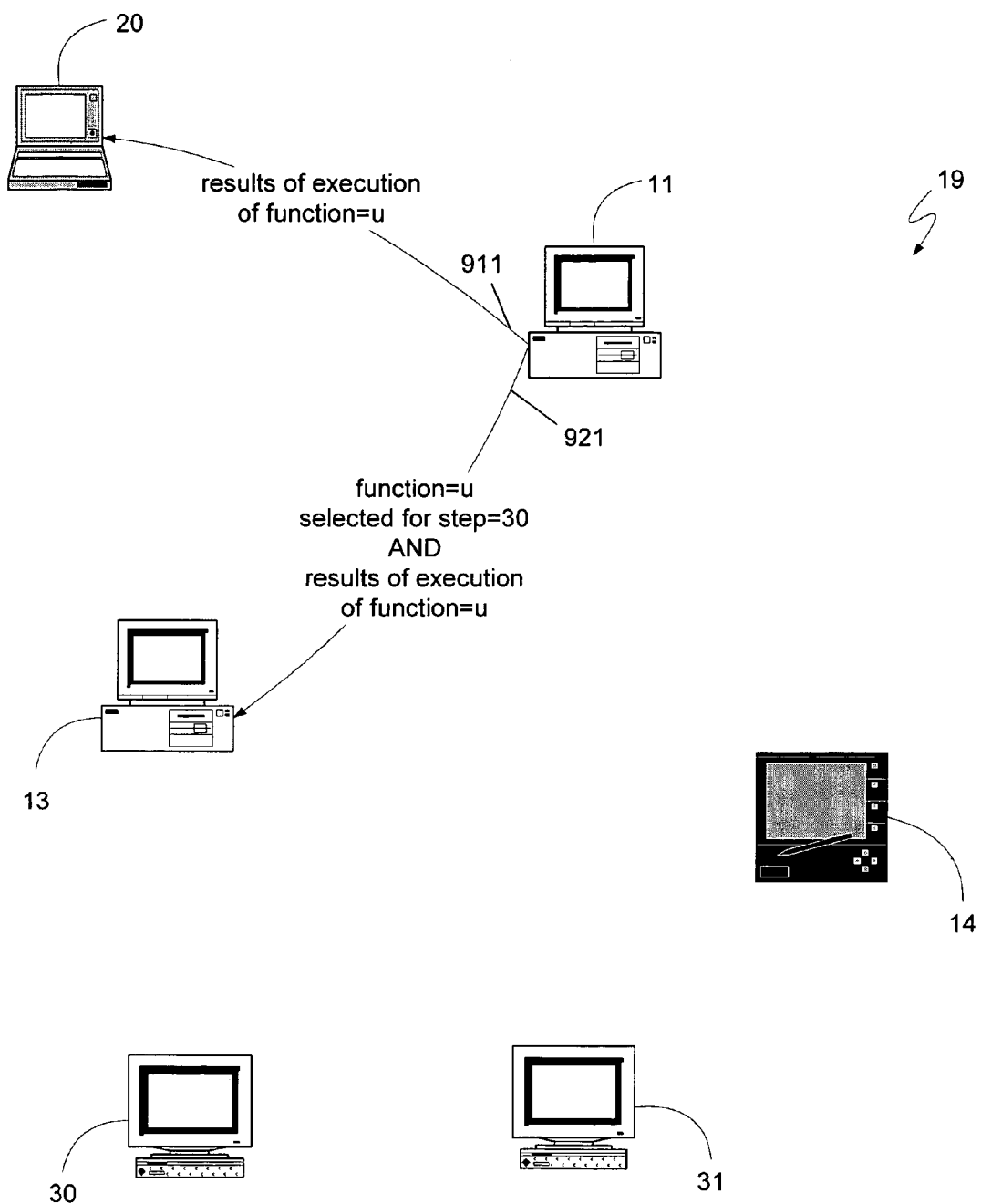

Turning to FIG. 10b, if device 11 determines it should vote for the proposal contained in message 901, it can proceed to execute function "u", since device 11 is aware that both it and device 13 have voted for the execution of function "u". Thus, as illustrated in FIG. 10b, device 11 can, without waiting for additional messages, execute function "u" and send the results to the client 20 in message 911. As explained above, the leader, which can also be maintaining a copy of the system's state, can receive message 921 from device 11 providing, not only the results of the execution of function "u", but also an indication that the function "u" was selected for step 30. Alternatively, device 11 can simply send an indication of the selection of function "u" and allow device 13 to execute function "u" on its own copy of the system state.

As can be seen, devices 11 and 13 can perform a majority of the computational labor, and also can maintain the system's state, possibly requiring significant storage resources. Device 14, on the other hand, only participated to the extent that it was part of the quorum that selected the operational quorum of devices 11 and 13. Thus, device 14 can be an inexpensive device, as previously described.

The distributed computing system 19 can still tolerate the failure of one device, just as could system 10, illustrated and described previously. For example, and turning to FIG. 11a, device 11 is shown as having failed. The failure of device 11 can be detected by device 13 through any of various means, including pinging, timeouts, and the like. Because device 11 is no longer functioning properly, device 13 can propose changing the operational quorum to an operational quorum comprising only itself. While the operational quorum can be less than a majority, the decision to modify the operational quorum in such a manner can be made with a traditional quorum of the system 19, which can be a majority. Thus, device 13 sends message 1000, comprising the proposal to change the operational quorum, together with its vote for the proposal, to device 14.

Figure 11A:
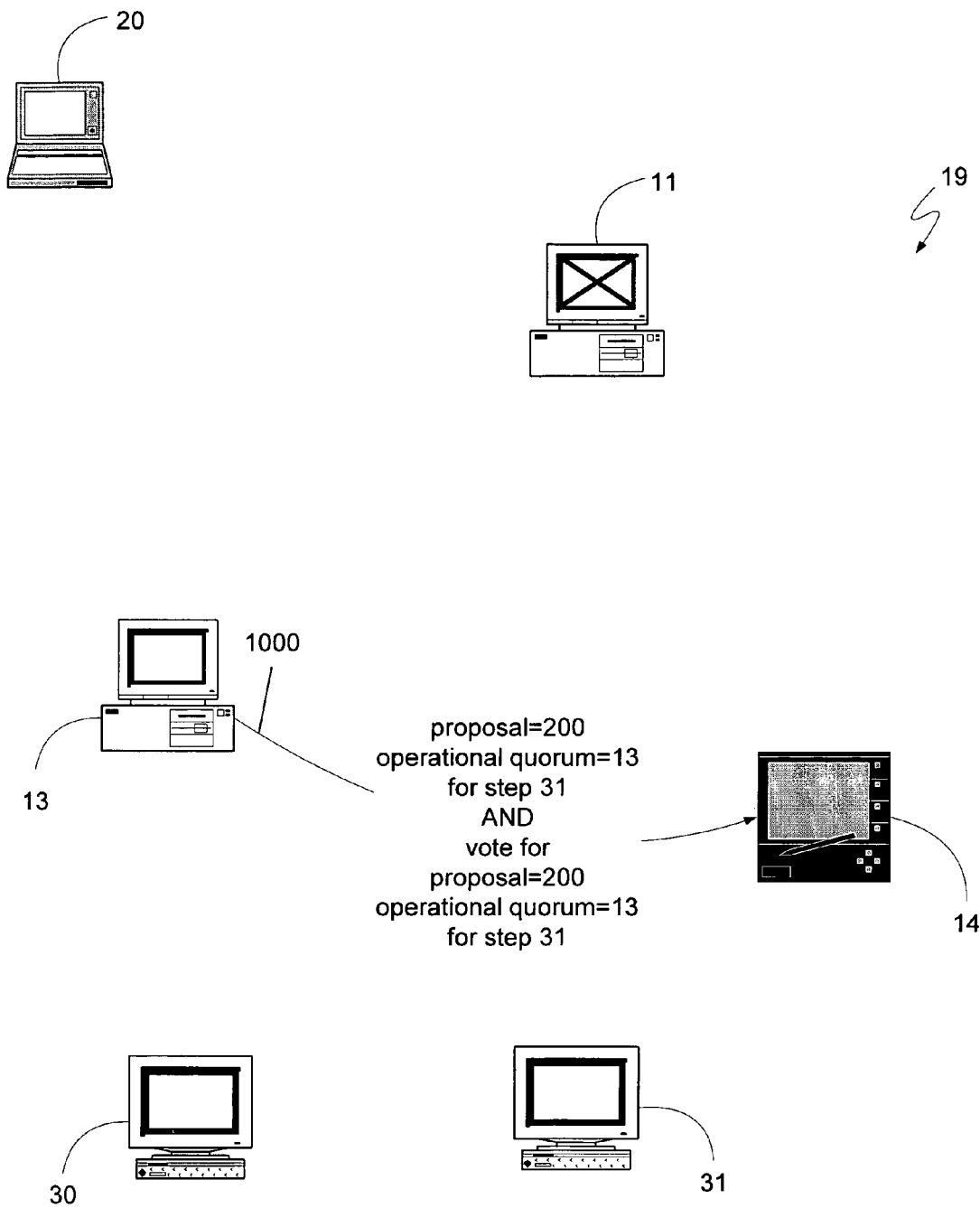
FIGS. 11a-b generally illustrate the operation of another simplified consensus algorithm with an inexpensive device contemplated by an embodiment of the present invention.
Figure 11B:
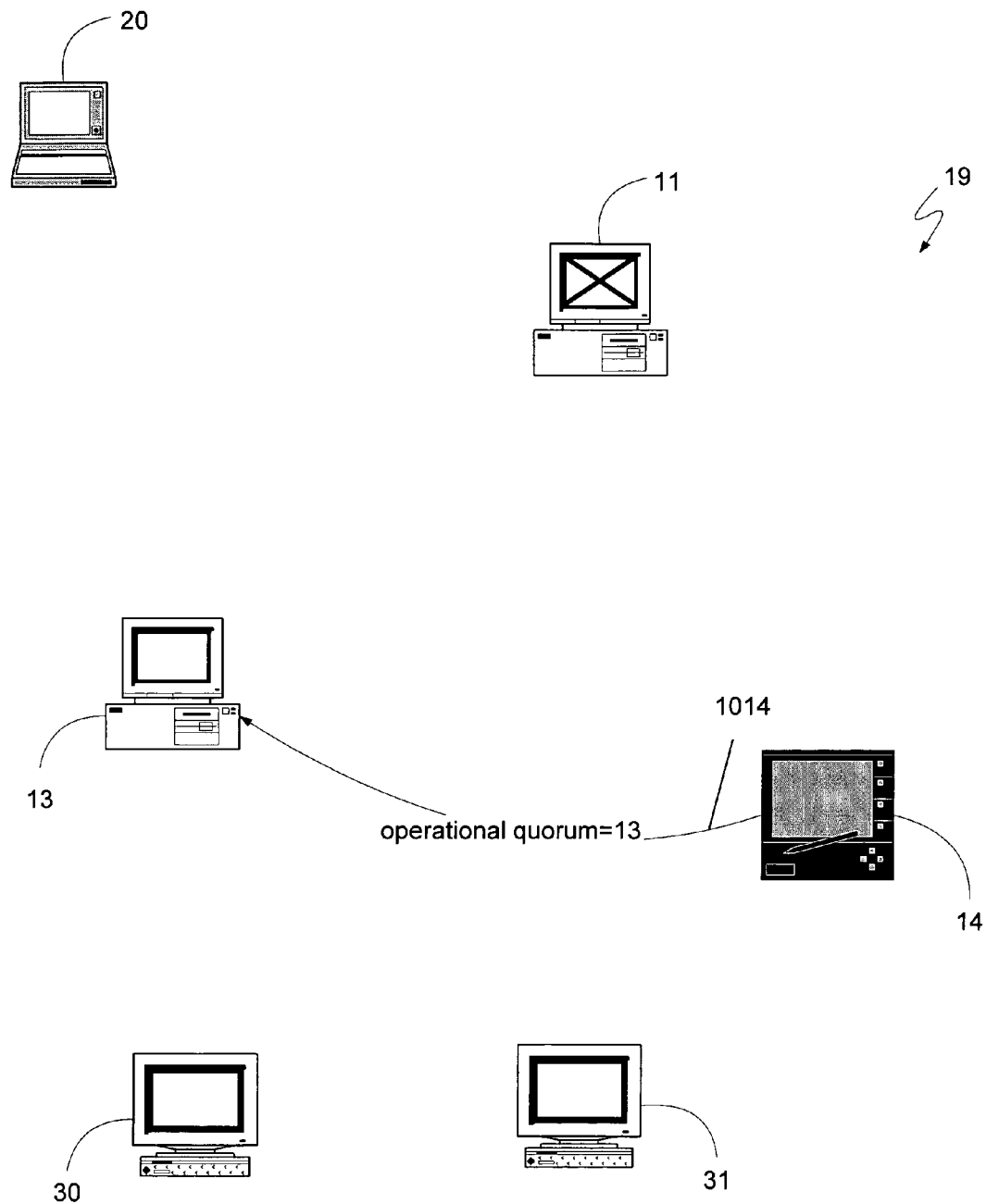

Because device 14 may be an inexpensive device, having limited processing or storage capabilities, an embodiment of the present invention allows device 14 to vote for every proposal it receives, so long as device 14 has not previously responded to another message having a higher proposal number, as described in detail above. Consequently, device 14 need not store a large quantity of information, nor does it need to perform extensive processing. Turning to FIG. 11b, device 14 can respond to device 13 with message 1014, indicating that it has voted for an operational quorum comprising device 13. Device 13 can then, by itself, act as a quorum for the distributed computing system 19.

Figure 12:
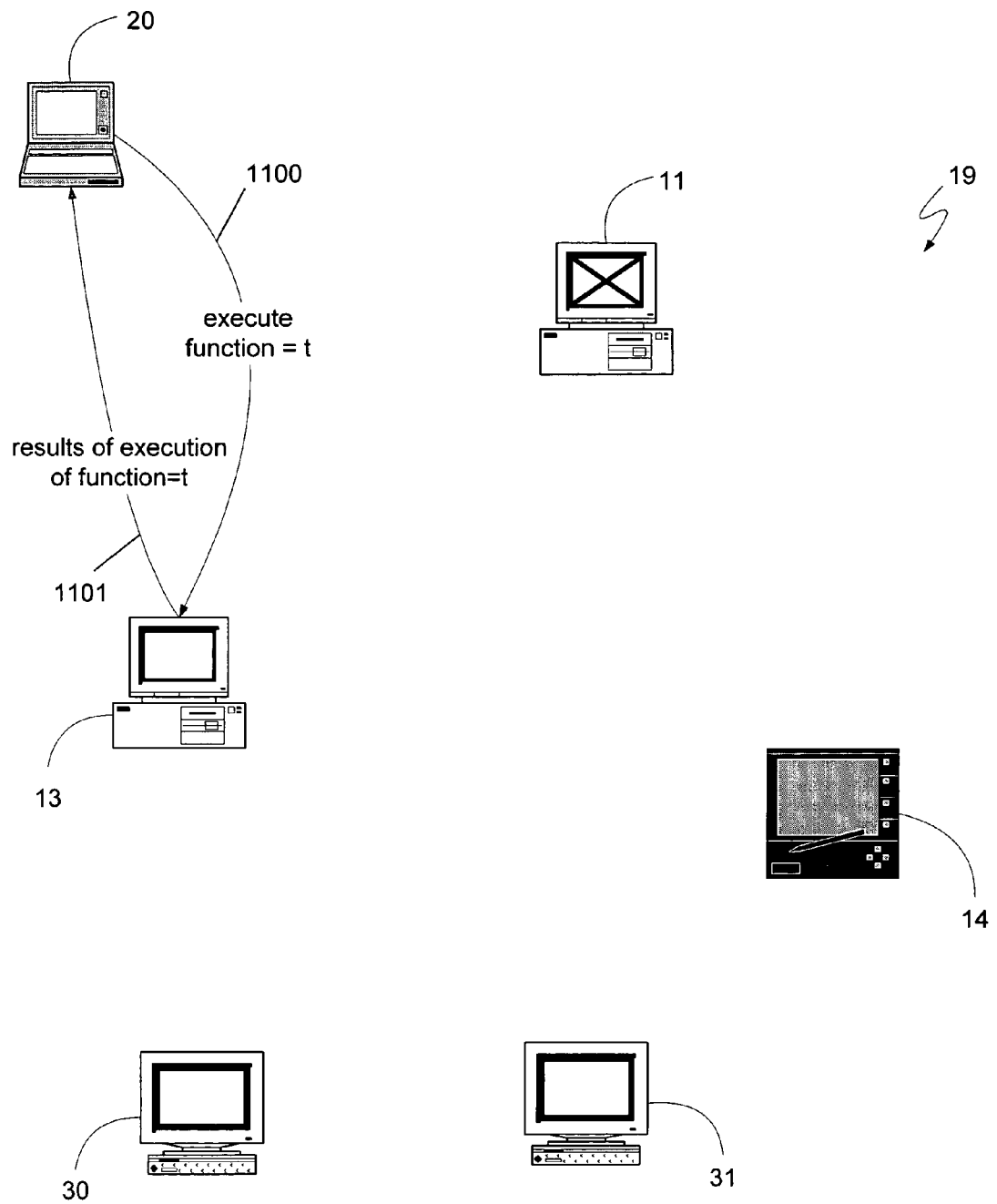
FIG. 12 generally illustrates the further operation of another simplified consensus algorithm with an inexpensive device contemplated by an embodiment of the present invention.

Turning to FIG. 12, the client 20 can send a request 1100 to the leader 13 to have the system 19 execute a function represented by the variable "t". However, as shown in FIGS. 11a and 11b, the new operational quorum comprises only device 13. Therefore, upon receipt of the client's request 1100, the device 13 can determine whether to execute the request, and if it executes the request, it can transmit the results back to the client 20 in the form of a return message 1101. Because the operational quorum illustrated in FIG. 12 comprises only device 13, device 13 need not propose the client's request 1100 to any other devices, and can decide whether to execute the requested function by itself. Similarly, if device 13 decides to execute the requested function, it can perform the execution and transmit the results back to the client 20, again without requiring agreement from any other device.

Figure 13A:
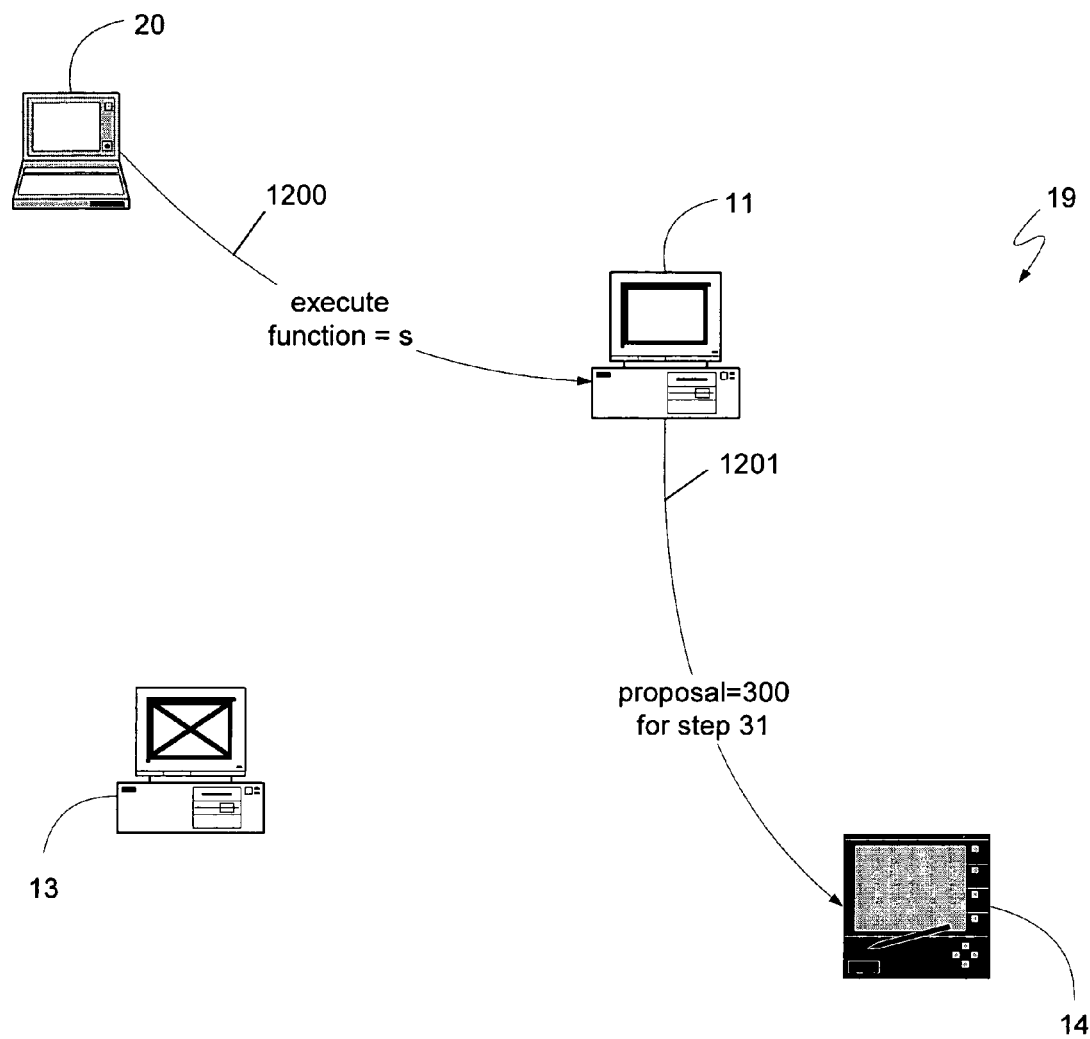
FIGS. 13a-b generally illustrate the operation of yet another simplified consensus algorithm with an inexpensive device contemplated by an embodiment of the present invention.

However, as will be understood by those skilled in the art, the disadvantage to allowing the distributed computing system 19 to implement a state machine using only one device is that if that device fails, then there is no other device with a redundant copy of the system's state. Turning to FIG. 13a, device 13 is shown as failed, while device 11 is shown as repaired. Thus, when device 11 receives a client's request 1200, it can attempt to change the operational quorum to comprise only device 11. Because device 11 was not the current leader device, it can attempt to become a leader device by sending a proposal message 1201, proposing a proposal number of 300, for step 31. As explained in detail above, device 11 can select a proposal number greater than the largest previous proposal number of which it is aware. Since device 11 is aware of a proposal number of 200 being used for step 30, as illustrated by message 901 in FIG. 10a, device 11 can select a higher proposal number when it seeks to become a leader. Similarly, because device 11 is aware of the execution of a function for step 30, as illustrated by message 911 in FIG. 10b, it can seek to propose a function for step 31.

Figure 13B:
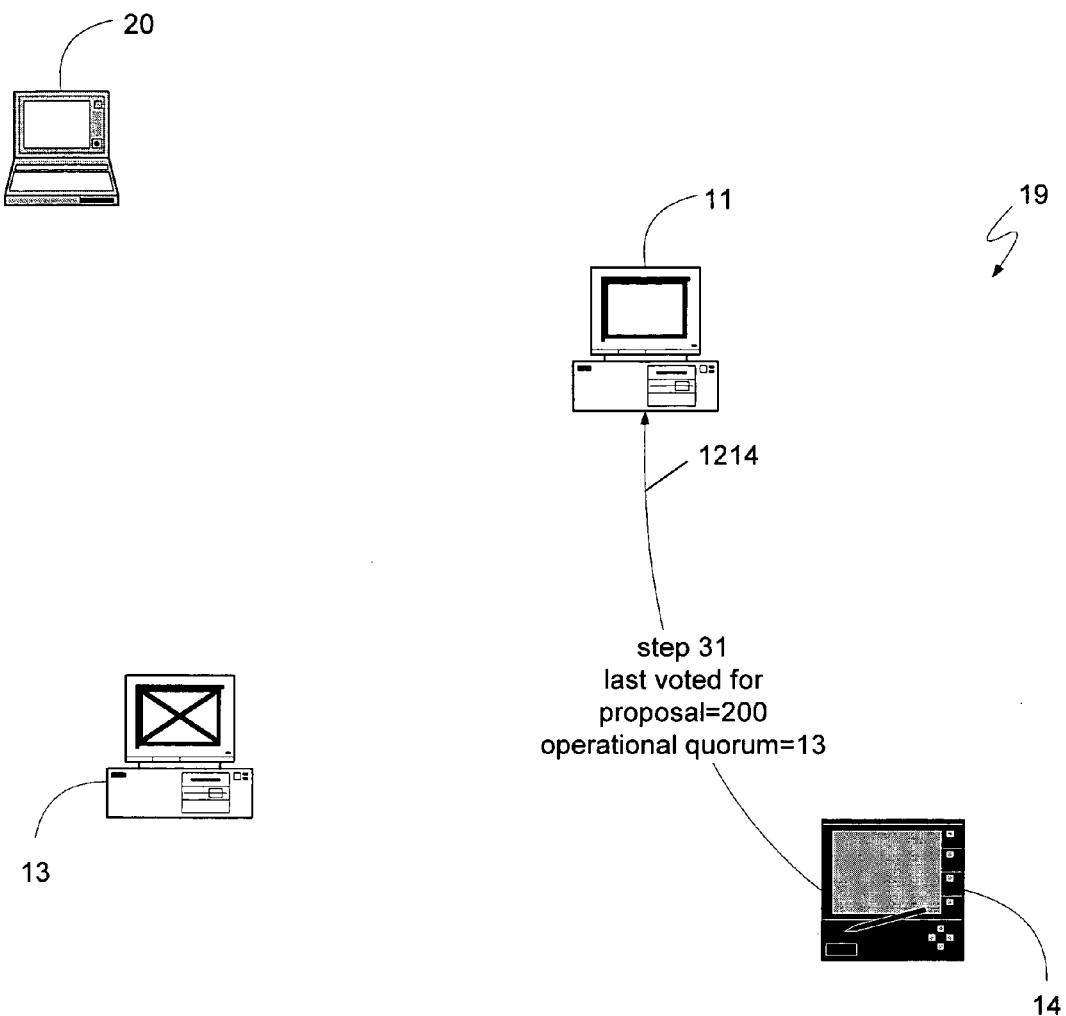

However, device 14 has already cast a vote for step 31, as shown by message 1014 in FIG. 11b. Therefore, in the manner described in detail above, device 14 can inform device 11 of its previous vote. Turning to FIG. 13b, device 14 is shown sending last vote message 1214 to device 11, informing it that device 14 had previously voted for a proposal for step 31 setting the operational quorum as device 13. Device 11 can then determine that a proper operational quorum can include device 13, and it can seek to propose an operational quorum that includes device 13 for a step greater than 31. Alternatively, device 11 can simply wait for device 13 to become operational again before proposing any other functions. In either event, device 11 cannot execute functions until it knows what functions device 13 executed when it comprised a quorum by itself. System 19 may therefore not execute further functions until device 13 is repaired or restarted.

In an alternative embodiment contemplated by the present invention, the selection of an operational quorum can occur prior to each vote for a function. In such a manner, only the currently operating devices can be part of an operational quorum. However, as will be known to those skilled in the art, such an embodiment may be inefficient if devices do not fail often.

As can be seen, by reducing the requirements placed on a device, such as device 14, one device of the distributed computing system can be selected to be an inexpensive device having limited computational ability and storage capacity. Nevertheless, the overall distributed computing system can continue to operate in a fault tolerant manner, with the only drawback to the use of an inexpensive device being that if, due to a failure, the operational quorum is being implemented by only one device, and then that device fails before the other device is repaired or replaced, the system may be forced to wait until the device that was last implementing the system is repaired, even if a quorum of operational devices exists prior to that time.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for distributed computing, the method comprising:

performing a distributed fault-tolerant consensus process in a distributed computing system to coordinate execution of system functions by a plurality of computing devices implementing said distributed computing system, wherein performing a distributed fault-tolerant consensus process comprises:

transmitting a message from a first transmitting device to a first recipient device, said first transmitting device generating said message while acting as a leader device among the plurality of computing devices, wherein the message comprises a proposed value, a vote for the proposed value, a first proposal identifier and a first step identifier, wherein the vote for the proposed value in said message provides the first recipient device information to determine, based on the vote for the proposed value and its own vote, whether a first quorum of the distributed computing system has selected the proposed value in a first system step identified by the first step identifier; and selecting the proposed value and transmitting, without waiting for additional messages, the selection of the proposed value to a client device that had originally proposed the proposed value, if the first proposal identifier is greater than or equal to a previously responded to proposal identifier.

2. The method of claim 1 further comprising:

transmitting a proposal for an operational quorum, a vote for the proposal for the operational quorum, a second proposal identifier and a second step identifier, wherein the vote for the proposal for the operational quorum provides a second recipient device sufficient information to determine, based on the vote for the proposal for the operational quorum and its own vote, whether a second quorum of the distributed computing system has selected the proposal for the operational quorum in a second system step identified by the second step identifier; and receiving an indication of the selection of the proposal for the operational quorum.

3. The method of claim 2, wherein the second quorum of the distributed computing system comprises a second transmitting device and the second recipient device, wherein the second transmitting device transmitted the proposal for the operational quorum, the vote for the proposal for the operational quorum, the second proposal identifier, and the second step identifier, and wherein the second recipient device is a computing device having limited computational ability and storage capacity.

4. A method for distributed computing, the method comprising:

performing a distributed fault-tolerant consensus process in a distributed computing system to coordinate execution of system functions by a plurality of computing devices implementing said distributed computing system, wherein performing a distributed fault-tolerant consensus process comprises:

receiving by a first recipient device, a message transmitted from a first transmitting device acting as a leader device among the plurality of computing devices, wherein the message comprises a proposed value, a vote for the proposed value, a first proposal identifier and a first step identifier, wherein the vote for the proposed value provides information for the first recipient device receiving said message to determine whether a first quorum of the distributed computing system has selected the proposed value in a first system step identified by the first step identifier; and selecting the proposed value and transmitting, without waiting for additional messages, the selection of the proposed value to a client device that had originally proposed the proposed value, if the first proposal identifier is greater than or equal to a previously responded to proposal identifier.

5. The method of claim 4 further comprising:

receiving a proposal for an operational quorum, a vote for the proposal for the operational quorum, a second proposal identifier and a second step identifier, wherein the vote for the proposal for the operational quorum provides sufficient information to determine whether a second quorum of the distributed computing system has selected the proposal for the operational quorum in a second system step identified by the second step identifier;

selecting the proposal for the operational quorum if the second proposal identifier is greater than or equal to a previously responded to proposal identifier; and transmitting an indication of the selection of the proposal for the operational quorum.

6. The method of claim 5, wherein the second quorum of the distributed computing system comprises a second transmitting device and a second recipient device, wherein the second transmitting device transmitted the proposal for the operational quorum, the vote for the proposal for the operational quorum, the second proposal identifier, and the second step identifier, and wherein the second recipient device received the proposal for the operational quorum, the vote for the proposal for the operational quorum, the second proposal identifier, and the second step identifier, and wherein the second recipient device is a computing device having limited computational ability and storage capacity.

7. A computer-readable storage medium having computer-executable instructions that are executable by a computer to perform a distributed fault-tolerant consensus method in a distributed computing system to coordinate execution of system functions by a plurality of computing devices implementing said distributed computing system, the distributed fault-tolerant consensus method comprising:
   transmitting a message from a first transmitting device to a first recipient device, said first transmitting device generating said message while acting as a leader device among the plurality of computing devices, wherein the message comprises a proposed value, a vote for the proposed value, a first proposal identifier and a first step identifier, wherein the vote for the proposed value in said message provides the first recipient device information to determine, based on the vote for the proposed value and its own vote, whether a first quorum of the distributed computing system has selected the proposed value in a first system step identified by the first step identifier; and
   selecting the proposed value and transmitting, without waiting for additional Messages, the selection of the proposed value to a client device that had originally proposed the proposed value, if the first proposal identifier is greater than or equal to a previously responded to proposal identifier.

8. The computer-readable storage medium of claim 7, wherein the first quorum of the distributed computing system comprises the first transmitting device and the first recipient device.

9. The computer-readable storage medium of claim 7, wherein the proposed value is a proposed function to be executed by the distributed computing system.

10. The computer-readable storage medium of claim 9 further comprising computer-executable instructions for performing steps comprising receiving, from the first recipient device, a result of an execution of the proposed function by the first recipient device.

11. The computer-readable storage medium of claim 7 further comprising computer-executable instructions for performing steps comprising:
   transmitting, to a second quorum of devices in the distributed computing system, a suggested next proposal identifier for the first system step; and
   receiving, from each device in the second quorum of devices in the distributed computing system, a suggested next proposal identifier response, wherein the suggested next proposal identifier response is null if the each device in the second quorum of devices had not previously voted for the first system step, and wherein the suggested next proposal identifier response comprises an indication of a previously voted for value and a previously voted for proposal identifier, corresponding to the first system step, if each device in the second quorum of devices had previously voted for the first system step.

12. The computer-readable storage medium of claim 11 further comprising computer-executable instructions for performing steps comprising:
   selecting, as the first proposal identifier, a greater identifier than any of the previously voted for proposal identifier; and
   selecting, as the proposed value, one of the previously voted for value.

13. The computer-readable storage medium of claim 7 further comprising computer-executable instructions for performing steps comprising:
   transmitting a proposal for an operational quorum, a vote for the proposal for the operational quorum, a second proposal identifier and a second step identifier, wherein the vote for the proposal for the operational quorum provides a second recipient device sufficient information to determine, based on the vote for the proposal for the operational quorum and its own vote, whether a second quorum of the distributed computing system has selected the proposal for the operational quorum in a second system step identified by the second step identifier; and
   receiving an indication of the selection of the proposal for the operational quorum.

14. The computer-readable storage medium of claim 13, wherein the second quorum of the distributed computing system comprises a second transmitting device and the second recipient device, wherein the second transmitting device transmitted the proposal for the operational quorum, the vote for the proposal for the operational quorum, the second proposal identifier, and the second step identifier, and wherein the second recipient device is a computing device having limited computational ability and storage capacity.

15. The computer-readable storage medium of claim 13, wherein the operational quorum comprises the first quorum of the distributed computing system, and wherein the second system step precedes the first system step.

16. A computer-readable storage medium having computer-executable instructions that are executable by a computer to perform a distributed fault-tolerant consensus method in a distributed computing system to coordinate execution of system functions by a plurality of computing devices implementing said distributed computing system, the distributed fault-tolerant consensus method comprising:
   receiving by a first recipient device, a message transmitted from a first transmitting device acting as a leader device among the plurality of computing devices, wherein the message comprises a proposed value, a vote for the proposed value, a first proposal identifier and a first step identifier, wherein the vote for the proposed value provides information for the first recipient device receiving said message to determine whether a first quorum of the distributed computing system has selected the proposed value in a first system step identified by the first step identifier; and
   selecting the proposed value and transmitting, without waiting for additional messages, the selection of the proposed value to a client device that had originally proposed the proposed value, if the first proposal identifier is greater than or equal to a previously responded to proposal identifier.

17. The computer-readable storage medium of claim 16, wherein the first quorum of the distributed computing device comprises the first transmitting device and the first recipient device.

18. The computer-readable storage medium of claim 16 further comprising computer-executable instructions for performing steps comprising selecting the proposed value and transmitting the selection of the proposed value if the first proposal identifier is greater than or equal to a previously responded to proposal identifier.

19. The computer-readable storage medium of claim 16, wherein the proposed value is a proposed function to be executed by the distributed computing system.

20. The computer-readable storage medium of claim 19 further comprising computer-executable instructions for performing steps comprising executing the proposed function, and transmitting a result of the execution of the proposed function.

21. The computer-readable storage medium of claim 20 further comprising computer-executable instructions for performing steps comprising transmitting an indication of a selection of the proposed function.

22. The computer-readable storage medium of claim 16 further comprising computer-executable instructions for performing steps comprising:
receiving a suggested next proposal identifier for the first system step; and transmitting a suggested next proposal identifier response, wherein the suggested next proposal identifier response is null if no vote for the first system step was previously made, and wherein the suggested next proposal identifier response comprises an indication of a previously voted for value and a previously voted for proposal identifier, corresponding to the first system step, if a vote for the first system step was previously made.

23. The computer-readable storage medium of claim 16 further comprising computer-executable instructions for performing steps comprising:
receiving a proposal for an operational quorum, a vote for the proposal for the operational quorum, a second proposal identifier and a second step identifier, wherein the vote for the proposal for the operational quorum provides sufficient information to determine whether a second quorum of the distributed computing system has selected the proposal for the operational quorum in a second system step identified by the second step identifier;
selecting the proposal for the operational quorum if the second proposal identifier greater than or equal to a previously responded to proposal identifier; and
transmitting an indication of the selection of the proposal for the operational quorum.

24. The computer-readable storage medium of claim 23, wherein the second quorum of the distributed computing system comprises a second transmitting device and a second recipient device, wherein the second transmitting device transmitted the proposal for the operational quorum, the vote for the proposal for the operational quorum, the second proposal identifier, and the second step identifier, and wherein the second recipient device received the proposal for the operational quorum, the vote for the proposal for the operational quorum, the second proposal identifier, and the second step identifier, and wherein further the second recipient device is a computing device having limited computational ability and storage capacity.

25. The computer-readable storage medium of claim 23, wherein the operational quorum comprises the first quorum of the distributed computing system, and wherein the second system step precedes the first system step.

26. A computing device in a distributed computing system, wherein the computing device is configured to perform acts for implementing a distributed fault-tolerant consensus process to coordinate execution of system functions by a plurality of computing devices implementing the distributed computing system, said acts comprising:
the computing device transmitting a message to a first recipient computing device when said computing device is acting as a leader device among the plurality of computing devices, wherein the message comprises a proposed value, a vote for the proposed value, a first proposal identifier and a first step identifier to a first recipient computing device, wherein the vote for the proposed value in said message enables the first recipient computing device to determine whether a first quorum of the distributed computing system has selected the proposed value in a first system step identified by the first step identifier; and
selecting the proposed value and transmitting, without waiting for additional messages, the selection of the proposed value to a client device that had originally proposed the proposed value, if the first proposal identifier is greater than or equal to a previously responded to proposal identifier.

27. The computing device of claim 26, wherein the first quorum of the distributed computing system comprises the computing device and the first recipient computing device.

28. The computing device of claim 26, wherein the computing device is configured to perform further acts including:
transmitting, to a second quorum of devices in the distributed computing system, a suggested next proposal identifier for the first system step; and
receiving, from each device in the second quorum of devices in the distributed computing system, a suggested next proposal identifier response, wherein the suggested next proposal identifier response is null if the each device in the second quorum of devices had not previously voted for the first system step, and wherein the suggested next proposal identifier response comprises an indication of a previously voted for value and a previously voted for proposal identifier, corresponding to the first system step, if each device in the second quorum of devices had, for the first system step, previously voted.

29. The computing device of claim 28, wherein the computing device is configured to perform further acts including:
selecting, as the first proposal identifier, a greater identifier than any of the previously voted for proposal identifier; and selecting, as the proposed value, one of the previously voted for value.

30. The computing device of claim 26, wherein the computing device is configured to perform further acts including:
transmitting a proposal for an operational quorum, a vote for the proposal for the operational quorum, a second proposal identifier and a second step identifier, wherein the vote for the proposal for the operational quorum enables a second recipient computing device to determine whether a second quorum of the distributed computing system has selected the proposal for the operational quorum in a second system step identified by the second step identifier; and
receiving an indication of the selection of the proposal for the operational quorum.

31. The computing device of claim 30, wherein the second quorum of the distributed computing system comprises the computing device and the second recipient computing device, and wherein the second recipient computing device is a computing device having limited computational ability and storage capacity.

32. A computing device in a distributed computing system, wherein the computing device is configured to perform acts for implementing a distributed fault-tolerant consensus process to coordinate execution of system functions by a plurality of computing devices implementing the distributed computing system, said acts comprising:

the computing device receiving a message transmitted from a first transmitting device acting as a leader device among the plurality of computing devices, wherein the message comprises a proposed value, a vote for the proposed value, a first proposal identifier and a first step identifier, wherein the vote for the proposed value in said message enables the computing device to determine whether a first quorum of the distributed computing system has selected the proposed value in a first system step identified by the first step identifier; and selecting the proposed value and transmitting, without waiting for additional messages, the selection of the proposed value to a client device that had originally proposed the proposed value, if the first proposal identifier is greater than or equal to a previously responded to proposal identifier.

33. The computing device of claim 32, wherein the first quorum comprises the computing device and a first transmitting computing device.

34. The computing device of claim 32, wherein the computing device is configured to perform further acts including:

selecting the proposed value and transmitting, without waiting for additional messages, the selection of the proposed value to a client computing device that had originally proposed the proposed value, if the first proposal identifier is greater than or equal to a previously responded to proposal identifier.

35. The computing device of claim 32, wherein the computing device is configured to perform further acts including:

receiving a suggested next proposal identifier for the first system step; and transmitting a suggested next proposal identifier response, wherein the suggested next proposal identifier response is null if no vote for the first system step was previously made, and wherein the suggested next proposal identifier response comprises an indication of a previously voted for value and a previously voted for proposal identifier, corresponding to the first system step, if a vote for the first system step was previously made.

36. The computing device of claim 32, wherein the computing device is configured to perform further acts including:

receiving a proposal for an operational quorum, a vote for the proposal for the operational quorum, a second proposal identifier and a second step identifier, wherein the vote for the proposal for the operational quorum enables the computing device to determine whether a second quorum of the distributed computing system has selected the proposal for the operational quorum in a second system step identified by the second step identifier; selecting the proposal for the operational quorum if the second proposal identifier is greater than or equal to a previously responded to proposal identifier; and transmitting an indication of the selection of the proposal for the operational quorum.

37. The computing device of claim 36, wherein the second quorum of the distributed computing system comprises the computing device and a second transmitting device, wherein the second transmitting device transmitted the proposal for the operational quorum, the vote for the proposal for the operational quorum, the second proposal identifier, and the second step identifier, and wherein the computing device is a computing device having limited computational ability and storage capacity.

* * * * *